(12) United States Patent
Medwick et al.

(10) Patent No.: US 11,415,730 B2
(45) Date of Patent: Aug. 16, 2022

(54) SOLAR MIRRORS AND METHODS OF MAKING SOLAR MIRRORS HAVING IMPROVED PROPERTIES

(71) Applicant: Vitro Flat Glass LLC, Cheswick, PA (US)

(72) Inventors: Paul A. Medwick, Wexford, PA (US); John D. Basil, Pittsburgh, PA (US); Harry Buhay, Yardley, PA (US); Benjamin Kabagambe, Pittsburgh, PA (US); James W. McCamy, Export, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 73 days.

(21) Appl. No.: 16/939,795

(22) Filed: Jul. 27, 2020

(65) Prior Publication Data

US 2021/0011205 A1    Jan. 14, 2021

Related U.S. Application Data

(62) Division of application No. 15/208,778, filed on Jul. 13, 2016, now Pat. No. 10,942,302.

(60) Provisional application No. 62/219,386, filed on Sep. 16, 2015.

(51) Int. Cl.
| | |
|---|---|
| *G02B 5/08* | (2006.01) |
| *F24S 23/70* | (2018.01) |
| *C03C 17/36* | (2006.01) |
| *G02B 5/10* | (2006.01) |

(52) U.S. Cl.
CPC ........ *G02B 5/0875* (2013.01); *C03C 17/3613* (2013.01); *C03C 17/3639* (2013.01); *C03C 17/3644* (2013.01); *C03C 17/3655* (2013.01); *C03C 17/3663* (2013.01); *F24S 23/82* (2018.05); *G02B 5/10* (2013.01)

(58) Field of Classification Search
CPC ............ C03C 17/3613; C03C 17/3639; C03C 17/3644; C03C 17/3655; C03C 17/3663; G02B 5/0875; F24S 23/82
USPC .................................................. 359/884, 360
See application file for complete search history.

(56) References Cited

U.S. PATENT DOCUMENTS

| | | | |
|---|---|---|---|
| 4,746,347 | A | 5/1988 | Sensi |
| 4,792,536 | A | 12/1988 | Pecoraro et al. |
| 5,030,593 | A | 7/1991 | Heithoff |
| 5,030,594 | A | 7/1991 | Heithoff |
| 5,240,886 | A | 8/1993 | Gulotta et al. |

(Continued)

OTHER PUBLICATIONS

PCT International Search Report, PCT/US2016/042181, dated Nov. 9, 2016.

*Primary Examiner* — Cara E Rakowski
(74) *Attorney, Agent, or Firm* — The Webb Law Firm

(57) ABSTRACT

An article for reflecting solar energy includes a coating stack having solar reflecting films and metal oxide films, the coating stack applied on a major surface of a glass substrate, and a protective overcoat comprising a first and a second surface, wherein the first surface of the protective overcoat is disposed toward the solar reflective films and metal oxide films; and a polymer encapsulant over outer wall surfaces of the coating stack, the second surface of the protective overcoat and over peripheral edges of the coated article, the encapsulant having a base layer, a top layer and metallic corrosion-inhibitive material in the base layer.

16 Claims, 9 Drawing Sheets

(56) References Cited

U.S. PATENT DOCUMENTS

| | | | |
|---|---|---|---|
| 5,385,872 | A | 1/1995 | Gulotta et al. |
| 5,393,593 | A | 2/1995 | Gulotta et al. |
| 5,510,173 | A | 4/1996 | Pass et al. |
| 6,078,425 | A | 6/2000 | Wolfe et al. |
| 6,316,110 | B1 | 11/2001 | Anzaki et al. |
| 6,682,773 | B2 | 1/2004 | Medwick et al. |
| 6,849,328 | B1 | 2/2005 | Medwick et al. |
| 6,869,644 | B2 | 3/2005 | Buhay et al. |
| 6,916,542 | B2 | 7/2005 | Buhay et al. |
| 6,962,759 | B2 | 11/2005 | Buhay et al. |
| 7,311,961 | B2 | 12/2007 | Finley et al. |
| 8,445,098 | B2 | 5/2013 | Medwick et al. |
| 8,557,099 | B2 | 10/2013 | Kabagambe et al. |
| 2002/0172775 | A1 | 11/2002 | Buhay et al. |
| 2003/0228476 | A1 | 12/2003 | Buhay et al. |
| 2009/0015909 | A1 | 1/2009 | Fleury et al. |
| 2009/0233037 | A1 | 9/2009 | Medwick et al. |
| 2010/0221575 | A1 | 9/2010 | Stull |
| 2012/0145219 | A1 | 6/2012 | Medwick et al. |
| 2013/0003206 | A1* | 1/2013 | Kabagambe ............ C03C 17/42 359/883 |
| 2013/0342900 | A1 | 12/2013 | Koeckert et al. |
| 2014/0211332 | A1 | 7/2014 | Krasnov et al. |
| 2015/0116820 | A1 | 4/2015 | Kumagai |

\* cited by examiner

SOLAR MIRRORS AND METHODS OF MAKING SOLAR MIRRORS HAVING IMPROVED PROPERTIES

CROSS REFERENCE TO REPLATED APPLICATION

This application claims the benefits of U.S. Provisional Patent Application Ser. No. 62/219,386 filed on Sep. 16, 2015 and titled "SOLAR MIRRORS AND METHODS OF MAKING SOLAR MIRRORS HAVING IMPROVED SELECTED PROPERTIES". This application further is a divisional of, and claims the benefit of, U.S. patent application Ser. No. 15/208,778, which was filed on Jul. 13, 2016 and titled "SOLAR MIRRORS AND METHODS OF MAKING SOLAR MIRRORS HAVING IMPROVED PROPERTIES", and which was published on Mar. 16, 2017 as United States Patent Application Publication No. 2017/0075045 A1. U.S. Provisional Patent Application Ser. No. 62/219,386, U.S. patent application Ser. No. 15/208,778, and United States Patent Application Publication No. 2017/0075045 A1 are incorporated herein by reference in their entireties.

NOTICE OF GOVERNMENT SUPPORT

This invention was made with Government support under Contract No. DE-FC36-08GO18033 awarded by the U.S. Department of Energy. The United States Government may have certain rights in this invention.

BACKGROUND OF THE INVENTION

1. Field of the Invention

This application relates to articles for reflecting electromagnetic energy, especially electromagnetic energy emitted by the sun. The article includes but is not limited to solar mirrors and to methods of making solar mirrors having improved physical properties, e.g. but not limited to spectral properties to increase the usable life and performance of the solar mirror.

2. Presently Available Technology

As is appreciated by those skilled in the art of solar mirrors, solar power is becoming a more commercially acceptable and economically viable source of energy. By way of example and not limiting to the invention, a known application is using solar mirrors to concentrate solar light for electrical generation. As used herein, the term "solar light" means electromagnetic energy emitted by the sun. Solar mirrors having high reflectance of solar radiation are used for "concentrated solar thermal power (CSTP) installations. There are several different mirror geometries used for these applications. One system uses curved parabolic solar mirrors to concentrate solar energy onto tubes positioned along a focal line. A heat transfer medium in the tubes carries the absorbed heat energy to a generator station where it is used for power generation. Another system uses a solar tower in which solar mirrors reflect and concentrate solar light onto a receiving surface on the tower. The heat generated by the focused solar light is transferred to a working fluid, such as sodium, and the heated working fluid is used for power generation.

Another application of such mirrors is for "concentrated photovoltaics" (CPV). In this application, mirrors focus or concentrate solar light onto photovoltaic (PV) devices, thereby improving the energy output per device.

In these systems, and as discussed above, it is desirable that the mirrors reflect as much solar light as possible, it is also desirable that the mirrors have as long a commercial life as possible to preclude frequent changing of the mirrors. Mirrors having a reflective surface are used to reflect solar energy to a focal point having the devices to convert solar light or energy to electric and/or thermal energy. In the practice of one non-limiting embodiment, the solar mirror includes a glass substrate having a first major surface and an opposite second major surface. The first major surface is designated to face the source of solar light, and the opposite second major surface of the glass substrate faces away from the source of solar light. In this non-limiting embodiment, a reflective coating is applied over the first major surface of the substrate. In another non-limiting embodiment of the invention, the reflective coating is applied over the second major surface of a light transmitting or transparent substrate, in the following discussion, the solar reflecting mating is applied over the second major surface of the transparent substrate. The second major surface faces away from the so of solar light or energy.

Further as is appreciated by those skilled in the art of solar mirror technology, it is desirable to maximize the amount of solar light reflected from the solar mirror and to maximize the useable service life of the solar mirror. The percent reflection of solar light from the solar mirror is equal to the irradiance of solar light reflected from the solar mirror divided by the irradiance of solar light incident on the solar mirror. The reflectance can be measured in any convenient manner, e.g. but not limited thereto, the reflectance of solar light in the practice of the invention was measured using a spectrophotometer.

Disclosed herein are methods and articles to increase the percent reflection of solar light from a solar mirror, and increasing the useable life of the solar mirror.

SUMMARY OF THE INVENTION

This invention relates to an article for reflecting solar energy including, among other things a substrate having a first surface and an opposite second surface, and a solar reflective coating. The solar reflecting coating including, among other things, a first metal solar reflecting film hereinafter also referred to as the "first metal film", the first metal film having a first surface and an opposite second surface; a second metal solar reflecting film hereinafter also referred to as the "second metal film", the second metal film having a first surface and an opposite second surface, and a parting layer or film having a first surface and an opposite second surface, wherein the first surface of the parting film is over the second surface of the first metal film and the first surface of the second metal film is over the second surface of the parting film, wherein the first surface of the first metal film is over and attached to the second surface of the substrate.

The invention further relates to an article for reflecting solar energy, having, among other things, a coating stack having among other things, solar reflecting films and metal oxide films, the costing stack applied on a major surface of a glass substrate; and a polymer encapsulant over outer wall surfaces of the coating stack, the second surface of the protective overcoat and over peripheral edges of the coated article, the encapsulant including, but not limited thereto, a base layer, a top layer and metallic zinc flakes in the base layer.

The above mentioned article further includes marginal edge portions of the top of the mating stack and the outer walls of the coating stack covered with the base layer and the base layer defines an uncoated area on the top surface of the coating stack, and the top layer overlays the base layer and the uncoated area of the top surface of the coating stack.

The invention still further relates to an article for reflecting solar energy, including, among other things, a coating stack secured to major surface of a glass substrate, the coating stack, comprising a solar reflecting layer, wherein the surface of the coating stack spaced from the substrate is electrically conductive, and a polymer encapsulant over outer wall surfaces of the coating stack, the encapsulant comprising a top layer eleotrodeposited (also known as "electrocoated") to the outer surface of the coating stack wherein the base layer of the encapsulant employs metallic zinc flakes.

DESCRIPTION OF THE INVENTION

Figure 1:
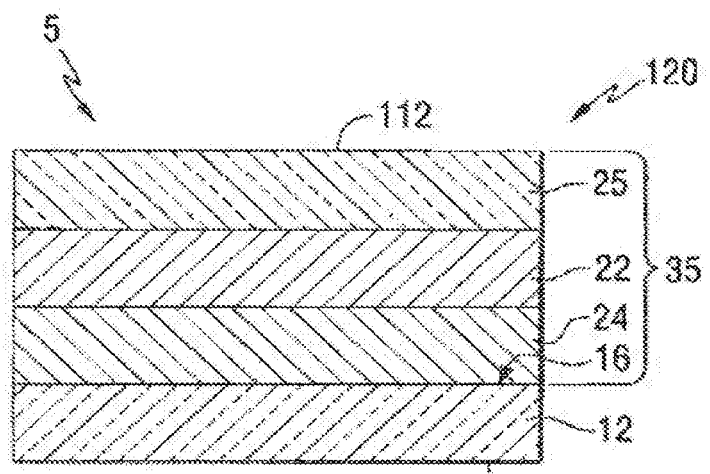
FIG. 1 is a cross sectional view of a prior art solar reflecting mirror showing the solar reflecting coating.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning a ending range values, and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in direct contact with the surface. For example, a coating layer "formed over" a substrate does not preclude the presence of one or more other coating layers or films of the same or different composition located between the formed coating layer and the substrate.

As used herein, the terms "polymer" or "polymeric" include oligomers, homopolymers, copolymers, and terpolymers, e.g., polymers formed from two or more types of monomers or polymers. The terms "ultraviolet region" or "ultraviolet radiation" mean electromagnetic energy having a wavelength in the range of 100 nanometers (hereinafter "nanometer" also referred to as "nm") to less than 380 nm. The terms "visible region" or "visible light" refer to electromagnetic radiation having a wavelength in the range of 380 nm to 780 nm. The terms "infrared region" or "infrared radiation" refer to electromagnetic radiation having a wavelength in the range of greater than 780 nm to 100,000 nm. Also, parameters such as "visible transmission" and "visible reflection" and the like are those determined using conventional methods. Those skilled in the art will understand that properties such as visible transmission or visible reflection can yaw based on the physical dimensions, e.g., thickness, of the article being tested. Therefore, any comparison to the present invention should be calculated at an equivalent thickness.

Before discussing several non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise, in the following discussion like numbers refer to like elements.

Non-limiting embodiments of the invention are directed to solar mirrors. As can be appreciated, the solar mirror ea be a flat solar mirror, e.g. but not limited to the prior art flat solar mirror 5 (FIG. 1) and/or flat solar mirror 7 incorporating features of the invention (FIG. 3), or a shaped solar mirror, e.g. but not limited to shaped solar mirror 9 (FIG. 2) having a concave surface 10 and an opposite convex surface 11 and discussed in detail in United States Published Patent Application 2010/0242953 (hereinafter also referred to as "Pub. '953"), Pub. '953 in its entirety is hereby incorporated by reference.

Non-limiting embodiments of the invention are discussed with reference to the reflection of electromagnetic radiation, such as, but not limited to, electromagnetic waves having wavelengths in the range of 300-2500 nm. As used herein, the term "reflective article refers to any article, e.g. but not limited to "solar mirrors" configured to reflect electromagnetic radiation, such as ultraviolet, visible, and/or infrared, radiation, e.g., for use in concentrated solar power systems. However, it is to be understood that the embodiments of the invention are not limited to use with solar mirrors, but could be practiced with articles in other fields, such as but not limited to laminated or non-laminated residential and/or commercial mirrors, and/or windows and/or reflectors for optical systems (e.g., video projectors or optical scanners), just to name a few. Therefore, it is to be understood that the specifically disclosed exemplary embodiments are presented simply to explain the general concepts of the invention and that the invention is not limited to these specific exemplary embodiments.

The non-limiting embodiments of the invention to be discussed herein include, but are not limited to (A) a solar reflective coating having improved optics and stability; and (B) an encapsulated coating stack of a solar mirror to increase useable life of the solar mirror. In the following discussion, the coating stack of the solar mirror employs magnetron sputtered vacuum deposited solar reflective films, layers and coatings. The invention, however, is not limited thereto, and the invention can be practiced with any type of deposited film, layer and/or coatings, e.g., chemical vapor deposition coating process. It is understood that the embodiments of the invention are presented in separate identified sections for an appreciation of the non-limiting embodiments of the invention and not to indicate in one form or another that the embodiments of the invention are independent and distinct from one another. As is appreciated, the non-limiting embodiments of the invention can be used alone or in combination with one another.

Solar Reflective Coating Having Improved Optics and Stability

Figure 2:
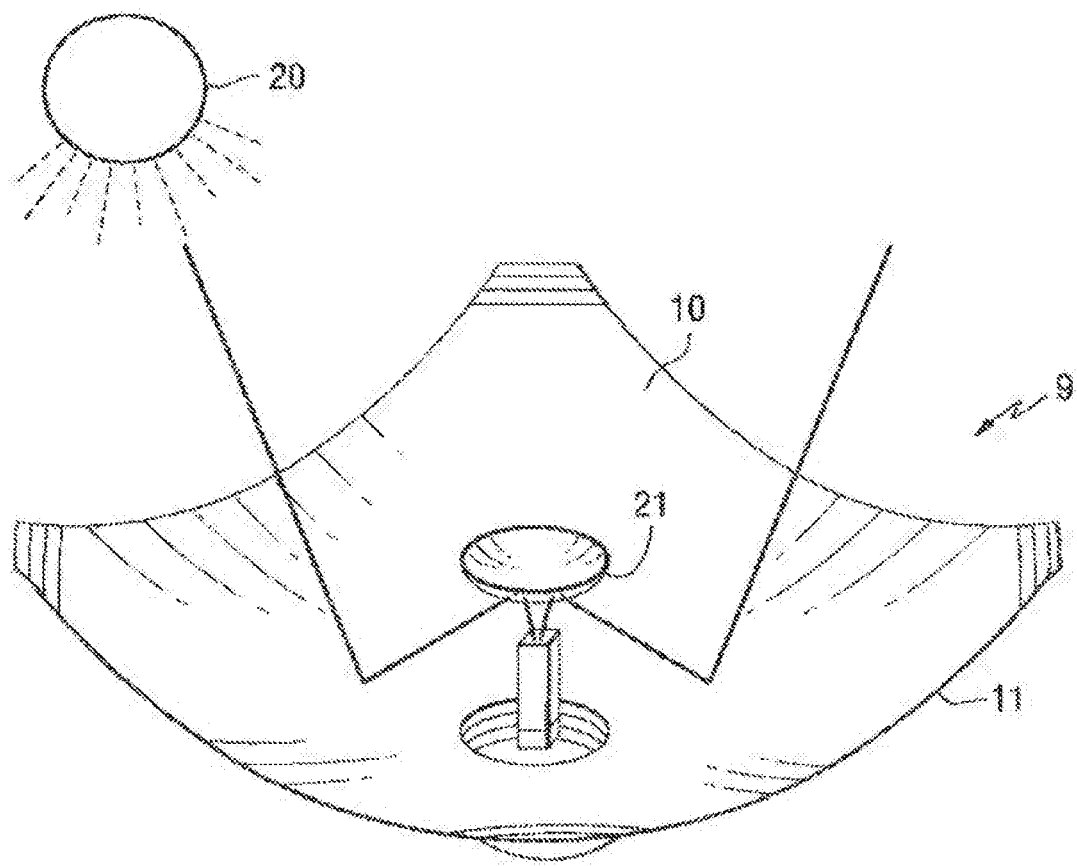
FIG. 2 is an isometric view of a prior art shaped solar mirror showing an enlarged view of a sun's ray incident on the concave surface of the solar mirror.

This non-limiting embodiment of the invention provides a solar reflective coating and a method of applying the solar reflective coating to a substrate to provide a solar mirror having improved optics and thermal stability compared to the solar mirrors of the prior aft Prior art solar mirror 5 shown in FIG. 1 includes a substrate or ply 12 having a first major surface 14, i.e. an outer major surface 14, and an opposed second major surface 16, or inner major surface 16. The solar mirror 9 shown in FIG. 2 has a concave solar reflective surface 10 that faces the sun 20 to reflect the solar energy to a focal point 21. In the following discussion, the first major surface or outer surface 14 of the substrate 12, and the concave surface 10 or outer surface 10 of the solar mirror 9 are designated to face the incident radiation, e.g. the sun 20 (the sun 20 shown only in FIG. 2), and the second surface 16 of the substrate 12 and the convex surface 11 of the solar mirror 9 faces an opposite direction of the incident radiation. With continued reference to FIG. 1, the surface 16 of the substrate 12 is designated to support solar reflective coating 22 of the prior art as shown in FIG. 1. Optionally an underlayer 24 is provided between the reflective coating 22 and the surface 16 of the ply 12. A protective coating 25 discussed in detail below is applied over the solar reflective coating 22.

Figure 3:
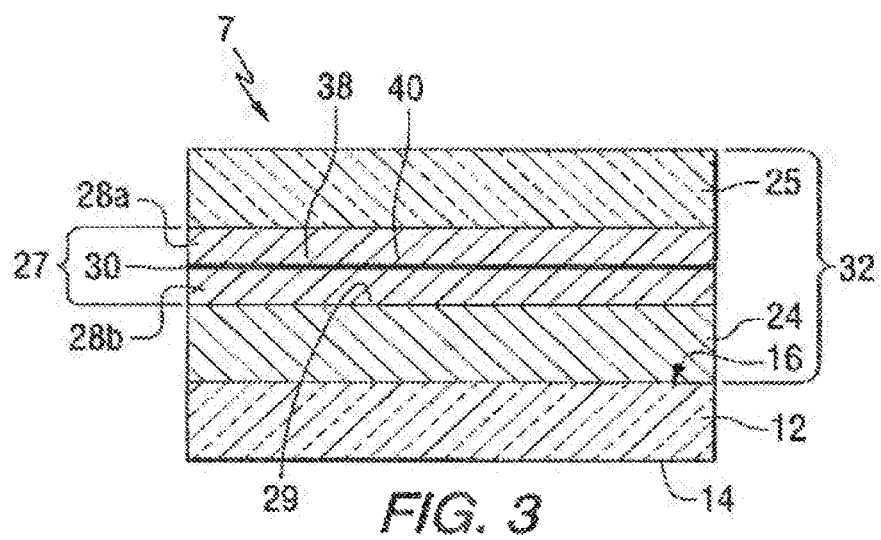
FIG. 3 is a view similar to the view of FIG. 1 showing a solar reflecting mirror of the invention having the solar reflecting coating of the invention.
Figure 4:
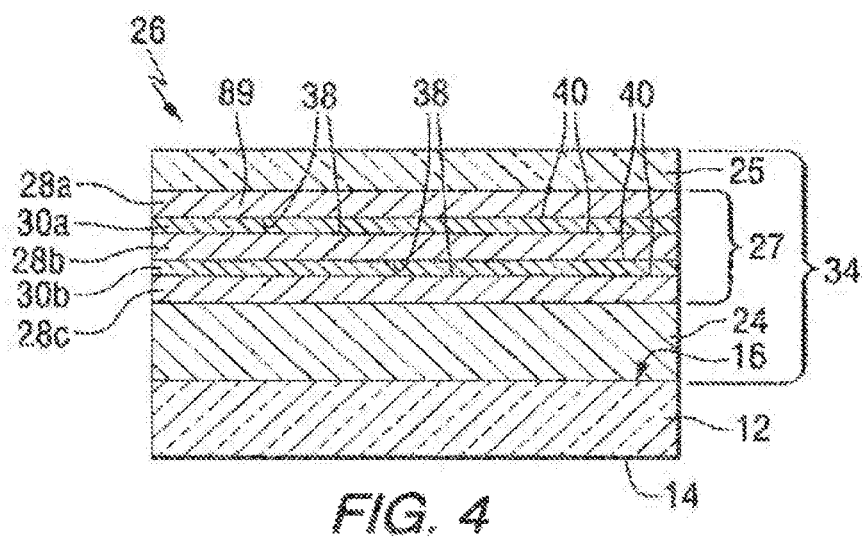
FIG. 4 is a view similar to the view of FIG. 3 showing another non-limiting embodiment of a solar reflecting coating of the invention.

The solar mirror 7 of the invention shown in FIG. 3 includes the substrate or ply 12 with the first major surface 14, i.e. an outer major surface, and the opposed second major surface 16, i.e. an inner major surface. Solar reflective coating 27 of the invention is applied over surface 29 of the underlayer 24 when an underlayer is present and over the surface 16 of the substrate 12 when an underlayer is not present, and the protective coating 25 applied over the solar reflective coating 27. In the following discussion, the first major surface 14 of the solar mirror 7 is designed to face the incident radiation, e.g. the sun, and the second surface 16 of the substrate 12 faces in the opposite direction of the incident radiation and is designated to support solar reflective coating 27 of the invention, With continued reference to FIG. 3, solar mirror 7 of the invention includes a solar reflective coating 27 having two sublayers 28a and 28b separated by a parting layer 30. Shown in FIG. 4 is a solar mirror 26 of the invention including three sublayers, e.g. sublayers 28a, 28b and 28c separated by a parting film or medium 30a and 30b to reduce crystal growth. The solar reflecting coating 27 of the invention is discussed in more detail below.

In the broad practice of the invention, the substrate or ply 12 can include any desired material having any desired characteristics. For example, when the first major surface 14 of the ply 12 faces the incident radiation, e.g. sun 20 (the sun 20 shown only in FIG. 3) and the second major surface 16 of the substrate or ply 12 supports or carries sublayers 28 and parting layers 30 of the solar reflective coating, for example but not limited to sublayers 28a and 28b. The ply 12 is preferably transparent or translucent to visible By "transparent" is meant having a transmission of greater than 0% up to 100% in a desired wavelength range, such as visible light. Alternatively, the ply 12 can be translucent. "Translucent" is meant allowing electromagnetic radiation (e.g., visible light) to be transmitted but diffusing or scattering this radiation. Examples of suitable materials for the ply 12 include, but are not limited to, thermoplastic, thermoset, or elastomeric polymeric materials, glasses, ceramics, and metals or metal alloys, and combinations, composites, or mixtures thereof. Specific examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, the ply 12 can include conventional soda-lime-silicate glass, borosilicate glass, or leaded glass. The glass can be clear glass. By "clear glass" is meant non-tinted or non-colored glass. Alternatively, the glass can be opaque, tinted or otherwise colored glass. The glass can be annealed or heat-treated glass. As used herein, the term "heat treated" means thermally tempered, thermally bent, heat strengthened, or laminated. The glass can be of any type, such as conventional float glass, and can be of any composition having any optical properties, e.g., any value of visible transmission, ultraviolet transmission, infrared transmission, and/or total solar energy transmission. Although not limiting to the invention, examples of glass suitable for the substrate or ply 12 are described U.S. Pat. Nos. 4,745,347; 4,792,536; 5,030,593; 5,030,594; 5,240,886; 5,385872; and 5,393,593. The substrate or ply 12 can be of any desired dimensions, e.g., length, width, shape, or thickness. In one exemplary embodiment, the first ply 12 can be greater than 0 up to 25 mm (1.00 inch) thick, such as 1 mm to 10 mm thick, e.g., 1 mm to 6 mm thick, e.g., less than 4 mm thick, e.g., 3 mm to 3.5 mm thick, e.g., 3.2 mm thick. Additionally, the ply 12 can be of any desired shape, such as flat, curved, parabolic-shaped, or the like. Also, when the primary reflective coating(s), e.g. the reflective coating 27 reside on the second major surface 16 of the solar mirror, the ply 12 can include, but is not limited to, one or more materials that exhibit low absorption of electromagnetic radiation in the region(s) of electromagnetic radiation desired to be reflected.

In one non-limiting embodiment of the invention, the ply 12 can have a high visible light transmission at a reference wavelength of 550 nanometers (nm) and a reference thickness of 3.2 mm. By "high visible light transmission" is meant visible light transmission at 550 nm of greater than or equal to 85%, such as greater than or equal to 87%, such as greater than or equal to 90%, such as greater than or equal to 91%, such as greater than or equal to 92%, such as greater than or equal to 93%, such as greater than or equal to 96%, at 3.2 mm reference thickness for the ply. Particularly useful glass for the practice of the invention is disclosed in U.S. Pat. Nos. 5,030,593 and 5,030,584. Non-limiting examples of glass that can be used for the practice of the invention include, but are not limited to, Starphire.R™, Solarphire.R™, Solarphire.R™. PV, Solargreen.R™, Solextra.R™, GL-20.R™, GL-35.™, Solarbronze.R™, CLEAR, and Solargray.R™ glass, ell commercially available from PPG industries Inc. of Pittsburgh, Pa.

As can be appreciated by one skilled in the art, the ply 12 (see FIGS. 1 and 3) is transparent when the ply 12 is between the sun 20 and the reflective coating 22, and the ply can be opaque or transparent when the solar reflective coating is between the sun 20 and the ply.

With reference to FIG. 3, in another non-limited embodiment of the invention, the layer 24 or undercoat 24 or underlayer 24 is provided between the sublayer 28b of the so/air reflective coating 18 and the second major surface 16 of the ply 12. The undercoat 24 is preferably deposited using a vacuum-based process and immediately prior to deposition of the vacuum-deposited silver (Ag) reflective coating layer 27 without breaking vacuum so as to provide a virgin surface to receive the solar reflecting coating 27. The undercoat 24 can provide a stronger or more durable interface between the ply 12 and the reflective coating 27. The undercoat 24 can include, but is not limited to one or more materials chosen such that the interface between the undercoat 24 and the solar reflective coating 27 is more mechanically, chemically, and/or environmentally stable than an interface between the ply 12 and the primary reflective coating 27. Also, the undercoat 24 can serve as a diffusion barrier to the elemental exchange between the ply 12 and the reflective coating 27 (such as the migration of sodium out of the glass ply 12 into the overlying coating(s) or the migration of metal, e.g., silver, from the reflective coating 27 to the glass), especially as might occur as the result of subjecting the coated article to elevated temperatures, for example, for bending or heat strengthening.

Additionally or alternatively, the undercoat 24 can provide a smoother or more planar surface upon which to deposit an overlaying coating, e.g., the solar reflective coating 27. Examples of materials suitable for the undercoat 24 include, but are not limited to, inorganic materials such as but not limited to light transmitting log absorption dielectrics, such as metal oxides, metal nitrides and/or combinations thereof, composites, or mixtures of metal oxides and/or metal nitrides, Examples of suitable metal oxides include alumina, silica, Mania, zirconia, zinc oxide, zinc stannate, tin oxide, or mixtures or combinations thereof. Other examples for the underlayer 24 include one or more layers of silicon dioxide and/or silicon nitride or combinations thereof. In one non-limiting embodiment, the undercoat or underlayer 24 includes but is not limited to titanic. The undercoat 24 can have any composition or thickness to provide sufficient functionality to the article (e.g., mechanical, chemical, passivation, planarization, adhesion, diffusion barrier properties, environmental durability enhancement, optical enhancement). In one particular embodiment where the undercoat 24 is titanic, the undercoat 24 has a thickness in the range of 0.1 nm to 5 nm, such as 0.1 nm to 3 nm, such as 0.5 nm to 3 nm, such as 1 nm to 3 nm, such as 0.6 nm to 2 nm, such as 1 nm to 2 nm, such as 1.5 cm to 2 nm, such as 1.8 nm.

With reference to FIGS. 3 and 4 as needed, in the preferred practice of the invention, the sublayer 28b of the solar reflecting coating 27 of the solar mirror 7 (FIG. 3), and the sublayer 28c of the solar reflecting coating 27 of the solar mirror 26 (FIG. 4) are formed over at least a portion of the second major surface 16 of the substrate 12, e.g. over at least a portion of the underlayer 24, if present, Optionally a protective coating 25 is provided over at least a portion of the solar reflective coating 27. While in the illustrated embodiment shown in FIGS. 3 and 4, the underlayer 24, the solar reflective coating 27 and the protective coating 25 are formed over the second major surface 16 of the substrate 12, it is understood that at least some of the coatings could alternatively be formed over the first major surface 14 of the substrate 12. The selection of material of the solar mirrors 7 and 26 of the invention, e.g. but not limited to the materials of the substrate 12, the optional undercoat or underlayer 24 employed to, among other things, act as a barrier coating to the solar reflective coating 27, and the protective coating 25 is also discussed in U.S. Pat. No. 8,445,098 ("Pat '098") is hereby incorporated by reference, and no further discussion is deemed necessary.

For ease of referencing the coating or films, the coating or films are discussed as individual coatings and films, e.g. but not limiting to the invention, the individual films of the solar mirror 7 of the invention shown in FIG. 3 are the underlayer 24, the solar reflective coating 27, which include sublayers 28a and 28b and the parting film 30, and the protective film 26 as shown in FIG. 3. The individual films of the solar mirror 26 of the invention shown in FIG. 4 are the underlayer 24, the reflective coating 27, which include sublayers 28a-c and the parting films 30a-b, and the protective film 25 as shown in FIG. 4. Optionally, the films of the solar mirror 26 shown in FIG. 4 can collectively be referred to as coating stack 34. For the prior art solar mirror 5 shown in FIG. 1 the individual films of the prior art solar mirror 5 shown in FIG. 1 are the underlayer 24, the solar reflective coating 22, and the protective film 25 as shown in FIG. 1 can optionally be referred to as prior art coating stack 35.

With reference back to FIGS. 3 and 4 as needed, the solar reflective coating 27 is formed over at least a portion of the second major surface 16, e.g., over at least a portion of the undercoat 24, if present. The solar reflective coating 27 of the invention includes, but is not limited to, two or more sublayers 28, e.g. sublayers 28a and 28b in FIG. 3 and sublayers 28a-c in FIG. 4. The component sublayers 28, in the preferred practice of the invention are solar reflective material or materials that reflect portions of the electromagnetic spectrum. In one non-limiting embodiment of the invention, the solar reflective coating 28 includes, but is not limited to radiation reflective metallic sublayers 28a and 28b, or 28a and 28b and 28c, and so forth. Examples of suitable reflective metals for the sublayers 28 of the solar reflective coating 27 include, but are not limited to, metallic silver, aluminum, gold, copper, platinum, iridium, osmium, palladium, ruthenium, rhodium, or other noble metals and alloys, mixtures, blends, or combinations thereof. In one non-limiting embodiment of the invention, the solar reflective coating 27 includes, but is not limited to metallic silver sublayers 28 such that thickness of the solar reflective coating 27 has a thickness in the range of 50 nm to 500 nm, and preferable 100 nm. The reflective solar coating 27 of FIG. 4 can be deposited to a thickness such that the solar mirror 7 and 26 have any particular desired level of reflectance in the desired range of electromagnetic radiation to be reflected. The sublayers 28a, 28b and 28c of the solar reflective coating 27 can be deposited to a thickness sufficient that the solar reflective coating 27 is opaque in a desired wavelength range, such as visible light. The solar reflective coating 27 can be particularly useful in reflecting visible and solar infrared energy, in one particular non-limiting embodiment of the invention, the solar reflective coating 27 is deposited by a conventional sputtering process, as described in more detail below. In another non-limiting embodiment of the invention, the coating stack 32 of the solar mirror 7 can include, but is not limited to a "high reflector" having a plurality of alternating high and low refractive index materials films as is known in the art, e.g. see FIG. 11 and the discussion of FIG. 11 for additional films.

The protective coating 25 assists in protecting the underlying layers of the coatings and/or films of the mating stack 32 of the solar mirror 7, and the coating stack 34 of the solar mirror 26 shown in FIGS. 3 and 4, respectively, from mechanical and chemical attack during manufacture, storage, transit, handling, processing, and/or during the mirror's service life in the field. The protective coating 25 also helps protect the underlying layers from the ingress of liquid water, water vapor, and other environmental solid, liquid or gas pollutants. The protective coating 25 can be an oxygen barrier waiting layer to prevent or reduce the passage of ambient oxygen into the underlying layers during subsequent processing, e.g., such as during heating or bending. The protective coating 25 can be of any desired material or mixture of materials, such as but not limited to one or more inorganic materials, in one exemplary embodiment, the protective coating 25 can include a layer having one or more metal oxide materials, such as but not limited to oxides of aluminum, silicon, or alloys, blends, combinations, or mixtures thereof. For example, the protective coating 25 can be a single coating layer comprising an oxide deposited by sputtering a sputtering target comprising silicon and aluminum in the range of 0 wt. % to 100 wt. % aluminum and/or 100 wt. % 0 wt. % silicon, such as 1 wt. % to 99 wt. % aluminum and 99 wt. % to 1 wt. % silicon, such as 5 wt. % to 95 wt. % aluminum and 95 wt. % to 5 wt % silicon, such as 10 wt. % to 90 wt. % aluminum and 90 wt. % to 10 wt. % silicon, such as 15 wt. % to 90 wt. % aluminum and 85 wt. % to 10 wt. % silicon, such as 50 wt. % to 75 wt. % aluminum and 50 wt. % to 25 wt. % silicon, such as 50 wt. % to 70 wt. % aluminum and 50 wt. % to 30 wt. % silicon, such as 35 wt. % to 100 wt. % aluminum and 65 wt. % to 0 wt. % silicon, e.g., 70 wt. % to 90 wt. % aluminum and 30 wt. % to 10 wt. % silicon, e.g., 75 wt. % to 85 wt. % aluminum and 25 wt. % to 15 wt. % of silicon, e.g., 88 wt. % aluminum and 12 wt. % silicon, e.g., 65 wt. % to 75 wt. % aluminum and 35 wt. % to 25 wt % silicon, e.g., 70 wt. % aluminum and 30 wt. % silicon, e.g., 60 wt. % to less than 75 wt. % aluminum and greater than 25 wt. % to 40 wt. % silicon. In one particular non-limiting embodiment, the protective coating 23 comprises an oxide deposited by sputtering a sputtering target comprising includes 40 wt. % to 15 wt. % aluminum and 60 wt. % to 85 wt. % silicon such as 85 wt. % silicon and 15 wt. % aluminum. Other materials, such as aluminum, chromium, hafnium, yttrium, nickel, boron, phosphorous, titanium, zirconium, and or oxides thereof, can also be present, such as to adjust the refractive index of the protective coating 25. In one non-limiting embodiment, the refractive index of the protective coating 25 can be in the range of 1 to 3, such as 1 to 2, such as 1.4 to 2, such as 1.4 to 1.8.

In one non-limiting embodiment of the invention the protective coating 25 includes, but is not limited to a combination of silica and alumina. The protective coating 25 can be sputtered from two cathodes (e.g., one silicon and one aluminum) or from a single cathode containing both silicon and aluminum. This silicon aluminum oxide protective coating 25 can be written as $Si_xAl_{1-x}O_{1.5+x/2}$, where x can vary from greater than 0 to less than 1. In one specific non-limiting embodiment of the invention, the protective coating 25 can be a silicon aluminum oxide coating ($Si_xAl_{1-x}O_{1.5+x/2}$) having a thickness in the range of 5 nm to 5,000 nm, such as 5 nm to 1,000 nm, such as 10 nm to 100 nm, e.g., 10 nm to 50 nm, such as 10 nm to 40 nm, such as 20 nm to 30 nm, such as 25 nm. Further, the protective coating 25 can be of non-uniform thickness. By "non-uniform thickness" is meant that the thickness of the protective coating 25 can vary over a given unit area, e.g., the protective coating 25 can have high and low spots or areas. In another non-limiting embodiment, the protective coating 25 includes but is not limited to a silicon aluminum oxide coating or mixture, combination, alloy, or blend of silica and alumina, such as 85 wt. % silica and 15 wt. % alumina, and has a thickness in the range of 10 nm to 500 nm, such as 20 nm to 300 nm, such as 50 nm to 300 nm, e.g., 50 nm to 200 nm, such as 50 nm to 150 nm, such as 50 nm to 120 nm, such as 75 nm to 120 nm such as 75 nm to 100 nm. In a particular non-limiting embodiment, the protective coating 25 can have a thickness of at least 50 nm, such as at least 75 nm, such as at least 100 nm, such as at least 110 nm, such as at least 120 nm, such as at least 150 nm, such as at least 200 nm.

In another non-limiting embodiment of the invention, the protective coating 25 includes but is not limited to silica having a thickness in the range of 10 nm to 100 nm, such as 10 nm to 80 nm, such as 20 nm to 80 nm, such as 30 nm to 70 om, such as 40 nm to 00 nm, such as 50 nm. In a further non-limiting embodiment, the protective coating 25 includes, but is not limited to, silica having a thickness in the range of 10 nm to 500 nm, such as 10 nm to 400 nm, such as 20 nm to 300 nm, such as 50 nm to 200 nm, such as 75 nm to 150 nm, such as 75 nm to 120 nm.

In another non-limiting embodiment of the invention, the protective coating 25 can include a multi-layer structure, e.g., a first layer with at least one second layer formed over the first layer. In one specific non-limiting embodiment, the first layer can include, but is not limited to alumina or a mixture, combination, blend, or alloy including alumina and silica. For example, the first layer can include, but is not limited to a silicon aluminum oxide deposited by sputtering a sputtering target having greater than 5 wt. % aluminum, such as greater than 10 wt. % aluminum, such as greater than 15 wt. % aluminum, such as greater than 30 wt. % aluminum, such as greater than 40 wt. % aluminum, such as 50 wt. % to 60 wt. % aluminum, such as in the range of 70 wt. % to 100 wt. % aluminum and 40 wt. % to 0 wt. % silicon, such as greater than 90 wt. % aluminum, such as greater than 96 wt. % aluminum. In one non-limiting embodiment, the first layer includes all or substantially all aluminum oxide. In one non-limiting embodiment, the first layer can have a thickness in the range of greater than 0 nm to 1 micron, such as 5 nm to 10 nm, such as 10 nm to 25 nm, such as 10 nm to 15 nm. The second layer can comprise silica or a mixture, combination, blend, or alloy comprising silica and alumina. For example, the second layer can comprise a silicon aluminum oxide deposited by sputtering a sputtering target having greater than 40 wt. % silicon, such as greater than 50 wt. % silicon, such as greater than 60 wt. % silicon, such as greater than 70 wt. % silicon, such as greater than 80 wt. % silicon, such as in the range of 80 wt. % to 90 wt. % silicon and 10 wt. % to 20 wt. % aluminum, e.g., 85 wt. % silicon and 15 wt. % aluminum. In one non-limiting embodiment, the second layer can have a thickness in the range of greater than 0 nm to 2 microns, such as 5 nm to 500 nm, such as 6 nm to 200 nm, such as 10 nm to 100 nm, such as 30 nm to 50 nm, such as 35 nm to 40 nm. In another non limiting embodiment, the second layer can have a thickness in the range of greater than 0 nm to 1 micron, such as 5 nm to 10 nm, such as 10 nm to 25 nm, such as 10 nm to 15 nm. In another non-limiting embodiment, the protective coating can be a bilayer formed by one metal oxide-containing layer (e.g., a silica and/or alumina-containing first layer) formed over another metal oxide-containing layer (e.g., a silica and/or alumina-containing second layer) wherein the two components of said bilayer protective coating have different chemical compositions. The individual layers of the multilayer protective coating 25 can be of any desired thickness. Non-limiting examples of suitable protective coatings 25 are described, for example, in U.S. patent application Ser. Nos. 10/007,382; 10/133,805; 10/397,001; 10/422,094; 10/422,095; and 10/422,096, which documents are incorporated herein by reference.

Comparing the solar mirrors 7 and 26 of the invention shown in FIGS. 3 and 4, respectively to the prior art solar mirror 5 shown in FIG. 1, the difference of interest to the present discussion is the solar reflecting coating 22 of the prior art solar mirror 5, and the solar reflecting coating 27 of the solar mirrors 7 and 26 of the invention. More particularly, the substrate 12, the underlayer 24 and the protective coating 25 of the prior art solar mirror 5 shown in FIG. 1, and of the solar mirrors 7 and 26 shown in FIGS. 3 and 4 respectively are similar if not identical. Based on the forgoing it can be appreciated that the difference between the solar mirrors of the prior art and the solar mirrors of the invention is the solar reflecting waling. More particularly, the solar reflecting coating 22 of the prior art is a monolithic solar reflecting film 22, e.g. a single silver (Ag) film whereas the solar reflecting coating 27 of the invention includes solar reflecting films or sublayers 28 separated by parting layers 30.

In the following discussion, reference is made to the non-limiting embodiment of the solar reflective coating 27 of the solar mirror 7 of the invention (see FIG. 3). The discussion, however, unless indicated otherwise is also applicable to the non-limiting embodiment of the solar reflective coating 27 of the solar mirror 26 of the invention (see FIG. 4). With reference to FIGS. 3 and 4 as needed, the solar reflective coating 27 of the invention has the parting layer 30 between the sublayers 28a and 28b (see FIGS. 1 and 3), and has the parting layers 30a and 30b between the sublayers 28a, 28b and 28c (FIG. 4). With reference to FIG. 4, surface 38 of the parting layer 30a can be in surface contact with adjacent surface 40 of the sublayers 28a or 28b and 28c if present, or a coating or film can be provided between the surface 35 of the parting layer 30 and the surface 40 of the sublayers 28a and 28b. Without limiting the scope of the invention, the non-limiting embodiment of the invention can be considered a solar mirror 7 having a solar reflective coating 27 having two solar reflective sublayers 28a and 28b (FIG. 3) and 28c (see FIG. 4 separated by a parting layer 30a (FIG. 3) and 30b (FIG. 4). In the practice of the invention, the surface 40 of the sublayer 28a is in surface contact with, or over adjacent surface 38 of the parting layer 30, and surface 40 of the sublayer 28b is in surface contact with the surface 38 of the parting layer 30. Notwithstanding the forgoing, the invention contemplates having additional eating layers between the surfaces 40 of the sub layers 28a and 28b, respectively of the solar reflective coating 27, and surfaces 38 of the parting film 30a and 30b, as shown in FIG. 4. This non-limiting embodiment of the invention is discussed in more detail below.

Practicing the invention provides a solar mirror 7 and 26 that Is optically more stable at elevated temperatures, e.g. 1180 to 1200° F., a temperature range that is suitable for high-temperature heat-treatment of glass such as thermal tempering, heat-strengthening, or bending, of the glass. Further, the solar reflectance coating 27 can exhibit a range of solar reflectance or transmittance in the region(s) of interest within the electromagnetic spectrum (e.g., ultraviolet, visible, near infrared, far infrared, microwave, radiowave, etc.). For example but not limiting to the invention, the solar mirrors 7 and 26 (FIGS. 3 and 4, respectively) can have a visible light reflection at a wavelength of 550 nm of at least 85%, such as at least 90%, such as at least 95% of the "visible light" reflectance adjacent one or more silver sublayers 28a, 28b, (FIG. 3) and 28c (FIG. 4).

The practice of the invention mitigates a potential reduction in the specular reflectance of the solar mirror of the invention, e.g. but not limited to solar mirrors 7 and 26 of FIGS. 3 and 4, respectively, by reducing the amount of light that is non-specularly (i.e. diffusely) reflected from the solar mirror 7 and 26 of the invention.

In order to illustrate the benefits of the instant invention, a term "specular-included reflectance" was adopted to mean all specular and non-specular (i.e. diffuse) contributions to the mirror's reflectance. Typically, one seeks to minimize the amount of specular-excluded (i.e. diffuse) reflectance in order to maximize the mirror's specular reflectance. A commercially available spectrophotometer can be used to measure the specular-included reflectance (which includes both specular and non-specular components) and its specular-excluded component. The instrument used to do so was a Hunter Ultrascan PRO spectrophotometer. The measured wavelength range was 350-1000 nm. The glass-side (i.e., energy incident on the uncoated surface of the specimen) specular-Included reflectance measured by the instrument is tabulated as a percentage of the incident light that is specularly and non-specularly reflected versus wavelength. Similarly, the glass-side specular-excluded reflectance measured by the instrument is tabulated as a percentage of the incident light that is non-specularly reflected versus wavelength. The tabulated values of specular-excluded reflectance can be weighted by the solar irradiance function and numerically integrated to yield a single number which we refer to as "specular-excluded solar-weighted glass-side reflectance" (often abbreviated herein as "SpEx WIRg" where "WIR" means "(solar-)weighted integrated reflectance", "Sp Ex" mean "specular-excluded", and the "g" subscript indicates that the light energy is incident on the glass-side (i.e. uncoated surface) of the solar mirror 7. For solar mirror applications, the surface(s) that are intended to receive the flux of reflected sunlight is/are referred to as the "receiver". It is typically desirable to minimize the specular-excluded solar-weighted glass-side reflectance (SpEx WIRg) because any light energy that is non-specularly reflected from a solar mirror may not be intercepted by the receiver's surface, thereby constituting a loss of the available incident solar energy.

Figure 5:
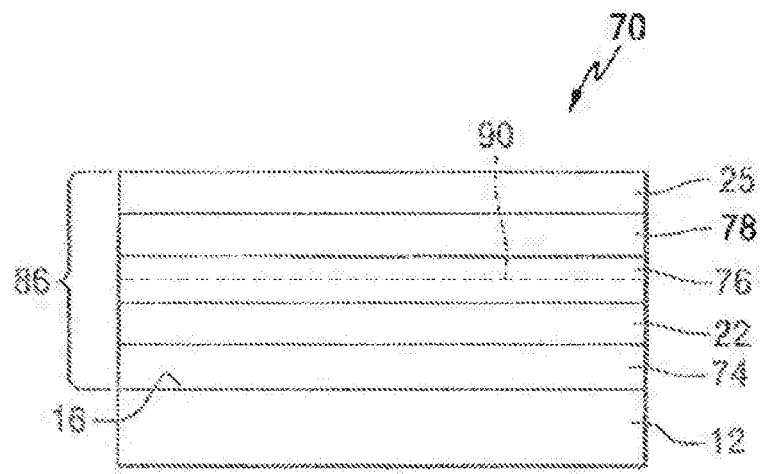
FIG. 5 is a view similar to the view of FIG. 1 showing another prior art embodiment of a solar mirror having additional coatings. Cross hatching not shown in FIG. 5 for purposes of clarity.

Two samples for comparison were made. Sample 1 was a prior art solar mirror designated by the number 70 and shown in FIG. 5, and Sample 2 was a non-limiting embodiment of a solar mirror of the invention designated by the number 72 and shown in FIG. 6. With reference to FIG. 5, the solar mirror 70 (Sample 1) of the prior art included:

1. A low iron glass substrate 12 of the type sold by PPG Industries Inc. under the registered trademark SOLARHIRE PV had a nominal thickness of 3.2 millimeter ("mm");
2. A titania (TiO2) undercoat or underlayer 74 had a thickness of 2 nm applied by MSVD to the surface 16 of the glass substrate 12;
3. A solar reflective coating of silver ("Ag") 22 had a thickness or 100 nm was applied by MSVD on the TiO2 undercoat film 74;
4. A Ti(Ox) "primer" or "barrier" or "blocking" layer 76 had a thickness of 2.5 nm applied by MSVD on the Ag film 22;
5. An oxide film of 52 wt. %-48 wt. % Sn ("Zn 52-Sn48 oxide") topcoat layer 78 had a thickness of 140 nm; also referred to as zinc stannate (Zn2SnO4) a piled by MSVD on the TI(Ox) "primer" layer 76;
6. An oxide of 85 wt. %. Si-15 wt. % Al ("Si85-Al15") aluminosilicate film 25, the film also known as Permanent Protective Overcoat ("PPO") had a thickness of 75 nm was applied on the "Zn52-Sn48 oxide" film 78; the ("Si85-Al15") aluminosilicate film 80 applied on the "Zn52-Sn48" topcoat layer film 78.

Figure 6:
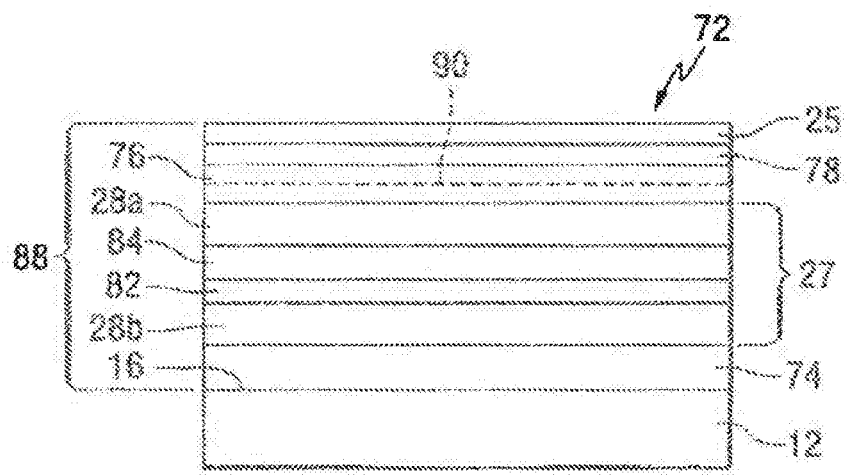
FIG. 6 is a view similar to the view of FIG. 5 showing the solar reflective coating of the invention with the additional coatings and films of FIG. 5. Cross hatching not shown in FIG. 6 for purposes of clarity.

With reference to FIG. 6, the solar mirror 72 of the invention (Sample 2) included but is not limited to:

1. A low iron glass substrate 12 of the type sold by PPG Industries Inc. under the registered trademark SOLARPHIRE PV had a nominal thickness of 3.2 millimeter ("mm");
2. A titania (TiO2) undercoat film 74 had a thickness of 2 nanometer applied by MSVD to the surface 16 of the glass substrate 12;
3. A sublayer 28b of a silver ("Ag") film 27 had a thickness of 50 nm applied on the TiO2 film 74;
4. A Ti(Ox) first parting film 82 had a thickness of 1.3 nm applied on the sublayer 28b of the Ag (50 nm) film;
5. A Zn2SnO4 second parting film 84 had a thickness of 3.6 nm on the patting Ti(Ox) film 82;
6. A silver sublayer 28a of the silver ("Ag") coating had a thickness of 50 nanometers ("nm") applied on the Zn2SnO4 second parting film 84;
7. A Ti(Ox) "primer" or "barrier" or "blocker" layer 76 had a thickness of 2.5 nm on the Ag sublayer 28a;
8. An oxide film of 52 wt. % Zn-48 wt. % Sn ("Zn52-Sn48 oxide") topcoat layer 84 had a thickness of 140 nm; also referred to as zinc stannate (Zn2SnO4) applied by MSVD on the TI(Ox) "primer" layer 76;
9. An oxide of 85 wt. % Si-15 wt. % Al ("Si85-Al15 oxide") aluminosilicate film (the PPO film) 25 having a thickness of 75 nm was applied on the "Zn52-Sn48" oxide film.

The Ti(Ox) film 76 for solar mirrors 70 and 72 did not have a sub number because the titanium (Ti) is deposited as metallic titanium inside the vacuum system and reacts with oxygen as the coating process continues. After coating deposition is complete, the titanium (Ti) has either completely oxidized or nearly completely oxidized. It the titanium is not completely oxidized in the as deposited state, any residual $TiO_x$ metallic titanium is expected to fully oxidized by subsequent high-temperature thermal processing (e.g. thermal tempering, heat-strengthening, bending).

Figure 7:
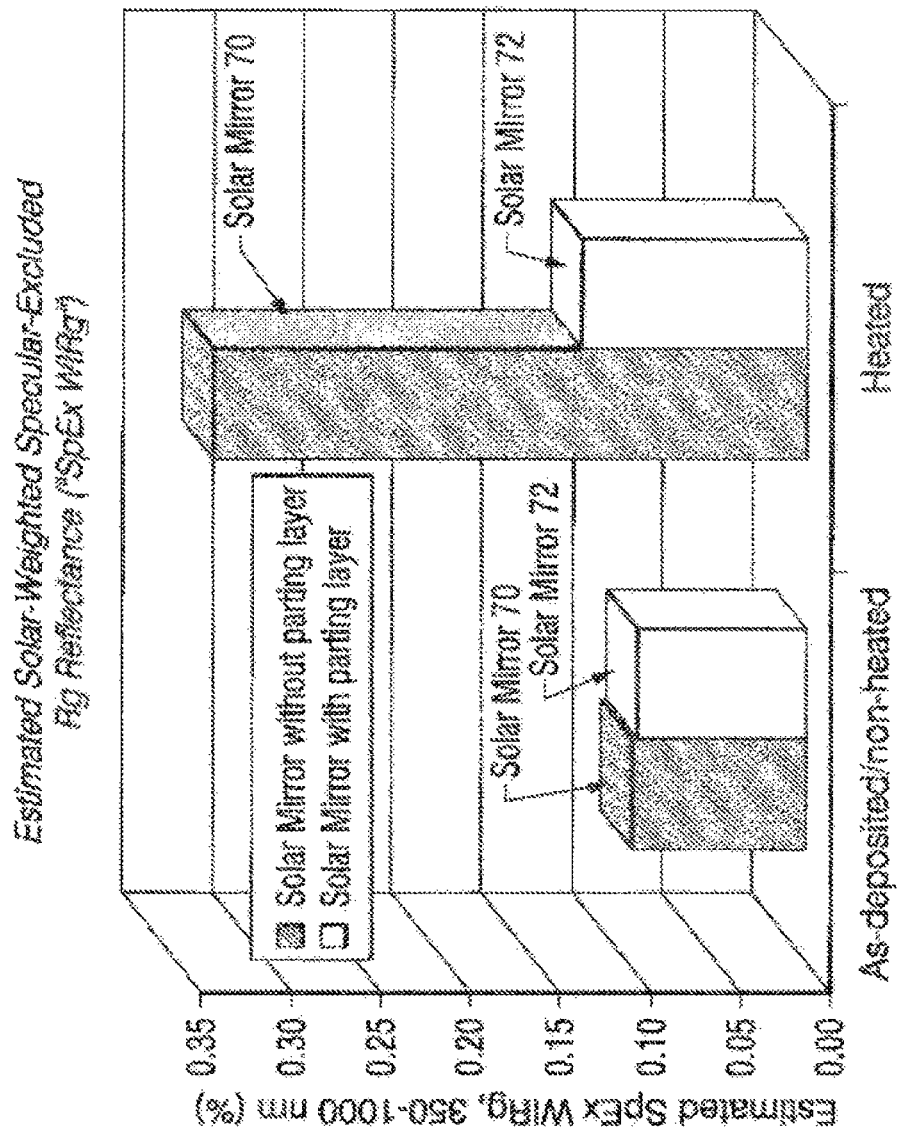
FIG. 7 is a graph showing approximate specular-excluded solar-weighted Rg reflectance ("SpEx WIRg") of a prior art solar reflecting mirror and a reflecting mirror of the invention.

FIG. 7 is a graph showing approximate specular-excluded solar-weighted Rg reflectance ("SpEx WIRg"), estimated using 350-1000 nm spectral R reflectance data, of experimental solar mirror coatings with and without solar reflecting coating 27 of the invention having parting layers 82 and 84, and sublayers 28a and 28b. As can be appreciated from the above discussion, the coating stack 86 of the solar mirror 70 of the prior art, and coating stack 88 of the solar mirror 72 of the invention are nominally identical except the prior art solar mirror 70 employs a monolithic Ag film 22, and the solar reflecting mirror 72 of the invention has the parting layers 82 and 84 in the mating stack 88 of the solar mirror 72 of the invention. The left side of the plot shows the specular-excluded solar-weighted glass-side reflectance of both solar mirrors 70 and 72 in their as-deposited/non-heattreated state. The right side of the plot shows the specular-excluded solar-weighted glass-side reflectance of both solar mirrors 70 and 72 after heat treatment to simulate thermal tempering. Considering the left side of the plot, the column at the extreme left is the data for solar mirror 70 without the parting films 82 and 84 of the invention, and the column immediately adjacent to the right is the data for solar mirror 72 of the invention with the parting films 82 and 84 of the invention. As one can see from FIG. 7, in their as-deposited/non-heat-treated states, the specular-excluded solar-weighted glass-side reflectance of solar mirrors 70 and 72 is similar. Considering the right side of the pot of FIG. 7, the column at the extreme, right is the date for the solar mirror 72 with the parting films 82 and 84 of the invention; the column immediately adjacent to the left is the data for solar mirror 70 without the parting films 82 and 84 of the invention. As one can see from FIG. 8, after heat-treatment to simulate thermal tempering, the specular-excluded solar-weighted glass-side reflectance of solar mirror 72 is: (a) similar to the value of the SpEx WIRg of the Solar mirror 72 in its as-deposited state, and (b) is lower than that of solar mirror 70 after solar mirror 70 has been subjected to heat-treatment. As is now appreciated, it is typically desirable to minimize Spa WIRg for solar mirror applications.

The information of FIG. 7 demonstrates that the prior art solar mirror and the solar mirror of the invention have about the same level of specular-excluded reflectance in their as deposited states, but significant differences when heattreated. Specifically, in the as-deposited/non-heated state, the prior art coated substrate 12 (solar mirror 70) and the coated substrate 12 of the invention (solar mirror 72) exhibited little/no haze, based on a qualitative visual assessment wherein the solar mirrors 70 and 72 were viewed in reflectance under incandescent floodlight illumination.

Furthermore, the "truncated" (350-1000 nm) estimated (solar) weighted specular-excluded reflectances, SpEx WIRg, of solar mirror 70 and solar mirror 72, in their as-deposited/non-heated states, were similar at about 0.09-0.1%. After heat-treatment to simulate thermal tempering, the specular-excluded solar-weighted Rg reflectance of the prior art solar mirror 70 exhibited about a three-fold increase to SpEx WIRg ~0.33%, whereas the reflectance of the solar mirror 72 of the invention, exhibited only a slight increase to SpEx WIRg ~0.13% (see FIG. 7).

Thus, FIG. 7 illustrates one benefit of the use of parting layers of the invention—namely, the ability to suppress an increase in specular-excluded solar-weighted Rg reflectance ("SpEx WIRg") immediately after high-temperature heat-treatment. Herein we refer to the Spa WIRg value measured immediately/shortly after high-temperature thermal tempering heat-treatment, without significant additional aging at morn temperature or other temperatures, as the "time-zero SpEx WIRg". Further sometimes the terms "haze", "non-specularity", "specular-excluded WIRg reflectance", and "SpEx WIRg" are used synonymously.

Another feature of the solar reflective coating of the invention is improved thermal stability of heat-treated mirrors aged at elevated temperatures, An experiment was conducted to simulate the performance of the solar mirror of the prior art (Sample 3), and a solar mirror of the invention (Sample 4) for a period of time greater than 10,000 hours at a temperature of 150° C. With reference to FIG. 5, Sample 3 includes buts not limited to:

1. The SOLARPHRE PV glass substrate 12 having a nominal thickness of 3.2 mm;
2. The TiO2 film 74 having a thickness of 2 nm is applied on the surface 16 of the substrate 12 facing away from the incident light, e.g. but not limited to the sun 20 (see FIG. 2);
3. The silver ("Ag") film 22 having a thickness of 100 nanometers ("nm") applied on the film 74 of TiO2;
4. Inconel 600 corrosion-resistance-enhancing and UV-absorbing film 90 having a thickness of (30 nm) is applied on the Ag silver film 22. The Inconel 600 is shown in phantom and only shown in FIG. 5;
5. The Ti(Ox) "primer" (or "barrier" or "blacker") layer 76 (~2.5 nm) on the Inconel 600 layer 90;
6. The oxide film of 52 wt. % Zn-48 wt. % Sn ("Zn52-Sn48 oxide") topcoat layer 78 having a thickness of (140 nm) on the Ti(Ox) "primer" 76; and
7. The Permanent Protective Overcoat layer 25 having a thickness of (75 nm) on the ("Zn52-Sn48 oxide") topcoat layer 78.

Sample 4 was a solar mirror of the invention and was similar to the solar mirror 72 shown in FIG. More particularly Sample 4 had:

1. The SOLARPHRE PV glass substrate 12 having a nominal thickness 3.2 mm;
2. The TiO2 film 74 having a thickness of 2 nm on the major surface 16 of the substrate 12 facing away from the incident light, e.g. but not limited to the sun 20 (see FIG. 3);
3. The first sliver (Ag) sublayer 28b of a silver (Ag) solar reflective coating 27 having a thickness of 50 nm on the TiO2 film 74;
4. A first Ti(Ox) parting film 82 had a thickness of about 1 nm on the Ag sublayer 28b having a thickness of 50 nm;
5. A second parting film comprising an oxide of 52 wt. % Zn-48 wt. % Sn ("Zn52-Sn48 oxide") 84, also known as zinc stannate (Zn2SnO4); the second parting oxide film 84 of Zn52-Sn48 having a thickness of about 1 nm on the first Ti(Ox) parting film 82;
6. The second sublayer Ag film 28a having a thickness of 50 nm on the first Ti(Ox) parting film 82;
7. The Inconel 600 corrosion-resistance-enhancing and UV-absorbing layer (not shown) having a thickness of 30 nm on the second Ag sublayer 28a);
8. Ti(Ox) "primer" (or "barrier" or "blocker") layer 76 had a thickness of ~2.5 nm on the Inconel 600 layer 90;
9. The oxide film of 52 wt. Zn-48 wt. % Sn ("Zn52-Sn48 oxide") topcoat layer 78 had a thickness of 140 nm on the Ti(Ox) "primer" 76; and
10. The Permanent Protective Overcoat (PPO) layer 25 had a thickness of 75 nm on the Zn52-Sn48 oxide topcoat layer 78.

It is noted that Sample 4 had two parting films 82 and 84 between two layers (see two parting films shown in FIG. 6) and the parting film 84 is a titanium oxide or titanium sub-oxide film which functions similar to the Ti(Ox) film 70 of solar mirror 72 shown in FIG. 6. The thickness of the parting layer is the sum of the thicknesses of all the parting films between the layers of the solar reflective coating, e.g. but not limited to 28a and 28b. For example and not limiting to the invention the thickness of the parting layer between the layers 28a and 28b, which comprises the parting films 82 and 84, of Sample 4 is about 2 nm.

The use of the corrosion-resistance-enhancing and UV-absorbing layer, e.g. the Inconel 600 film 90 is not limiting to the invention and is an optional feature of the invention. The corrosion-resistance-enhancing and UV-absorbing layer (hereinafter also referred to as the "corrosion-resistance-absorbing layer") provides various benefits, such as corrosion inhibition and ultraviolet screening benefits. Also, the corrosion-resistance-absorbing layer can provide some amount of electromagnetic energy reflection, which can permit a thinner primary reflective layer, e.g. but not limited to the sliver film. The corrosion-resistance-absorbing layer 90 can also provide mechanical and/or chemical protection to the underlying coating layers. The corrosion-resistance-absorbing layer can be provided under, over, or between one or more coating layers, e.g., the solar reflective coating(s) 27 or the top coat 78 (described above). Examples of suitable materials for the corrosion-resistance-absorbing layer include, but are not limited to, elemental metals and alloys of two or more metallic elements which are members of Groups 2-16 of the Periodic Table of the Elements, including, but not limited to, nickel and nickel-containing alloys ferrous alloys and iron-containing alloys such as stainless steels, aluminum end aluminum-containing alloys, copper and copper-containing alloys, chromium and chromium-containing alloys, titanium and titanium-containing alloys, brasses such as Naval brass (an alloy of Cu, Zn and Sn), Admiralty brass (an alloy of Zn, Sn and Cu), and Aluminum brass (an alloy of Cu, Zn and Al), cobalt and cobalt-containing alloys such as alloys of cobalt and chromium, zinc and zinc-containing alloys, tin and tin-containing alloys, zirconium and zirconium-containing alloys, molybdenum and molybdenum-containing alloys, tungsten and tungsten-containing alloys, niobium and niobium-containing alloys, indium and indium-containing alloys, lead and lead-containing alloys, and bismuth and bismuth-containing alloys. Specific non-limiting embodiments include corrosion-resistant metals and metal alloys including, but not limited to, nickel and nickel-containing alloys such as Nickel 200, Inconel alloys such as Inconel 600 and Inconel 625, stainless steels such as stainless steel 304 and stainless steel 316. Monel® alloys such as Monel 400, Hastelloy® alloys, cobalt and cobalt-containing alloys such as Stellite® alloys, Inco alloys such Inco Alloy C-276 and Inca Alloy 020, Incoloy® alloys such as Incoloy 800 and Incoloy 825, copper and copper-containing alloys such as brasses especially Naval Brass (approximately 59% copper, 40% zinc, and 1% tin) and Admiralty Brass (approximately 69% copper, 30% zinc, 1% tin), silicon and silicon-containing alloys, titanium and titanium-containing alloys, and aluminum and aluminum-containing alloys such as aluminum 6061. If present, the anti-corrosion coating(s) 90 can have any desired thickness. In some non-limiting embodiments, the corrosion-resistance-absorbing layer can have thicknesses in the range of, but not limited to, 1 nm to 500 nm, such as 1 nm to 400 nm, such as 1 nm to 300 nm, such as 1 nm to 200 nm, such as 1 nm to 100 nm, such as 10 nm to 100 nm, such as 20 nm to 100 nm, such as 30 nm to 100 nm, such as 40 nm to 100 nm, such as 50 nm to 100 nm, such as 20 nm to 40 nm, such as 30 nm to 40 nm, such as 30 nm to 35 nm.

Corrosion-resistance-absorbing layers are well known in the art and no further discussion is deemed necessary. For a more detailed discussion of corrosion-resistance-absorbing layer reference can be made to column 9, line 45 to column 11, line 2 of U.S. Pat. No. 8,445,098, which patent in its entirety is incorporated herein by reference.

Figure 8:
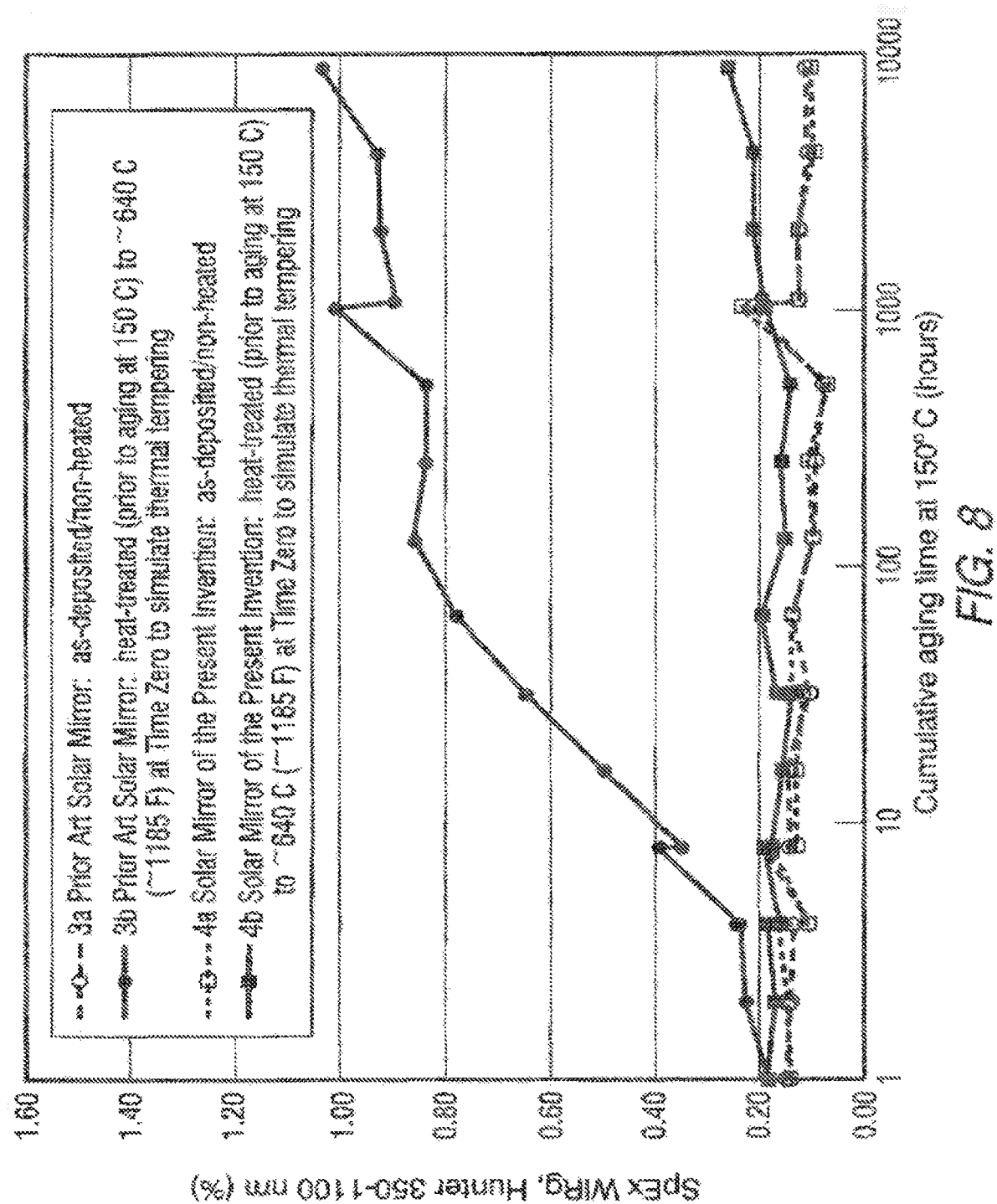
FIG. 8 is a graph showing approximate specular-excluded solar-weighted Rg reflectance (SpEx WIRg) of Samples 3a and 4a with their coating in the as deposited, unheated condition, and of Samples 3b and 4b with their coating in the deposited heated condition.

FIG. 8 is a graph showing approximate specular-excluded solar-weighted Rg reflectance (SpEx WIRg) of Samples 3a and 4a with their coating in the as deposited, unheated condition, and of Samples 3b and 4b with their coating in the deposited heated condition, i.e. maintained at 150 degrees C. (heated). For purposes of clarity Sample 3a is designed as a prior art solar mirror after heat-treatment at Time Zero to simulate thermal tempering (hereinafter referred to as "heated"); Sample 35 is designed as a prior art solar mirror in its as-deposited state (a.k.a. "unheated" and/or "as-deposited"); Sample 4a is designed as a solar mirror of the invention in its as-deposited state ("unheated/as-deposited"), and Sample 4b is designed as a solar mirror of the invention after heat-treatment at Time Zero to simulate thermal tempering (also known as "heated").

In their as-deposited (i.e. non-heat-treated) states, Sample 3a and Sample 4a exhibit relatively low values of SpEx WIRg as a function of aging time. In contrast, after heat treatment to simulate thermal tempering at Time Zero, Sample 3b (prior art) exhibits, a rapid increase in SpEx WIRg at relatively snort (e.g. 10-100 hours) aging times, and a more-gradual increase at longer aging times as shown by Curve 3b in FIG. 8. In contrast, heat-treated Sample 4b exhibits lower SpEx WIRg than the heat-treated Sample 3b at aging times greater than about 10 hours, and only a gradual increase with aging time thereby suggesting that the heat-treated Sample 4b is intrinsically more thermally stable than heat-treated Sample 3b. Furthermore, note that the SpEx WIRg values of heat-treated Sample 4b are similar to the SpEx WIRg values of Samples 3a and 4a in their as-deposited states throughout most of the aging of the specimens at 150° C.

From the above discussion the benefits and limitations of the solar reflective coating 27 of the invention that includes two or more layers 28a and 28b can now be appreciated. In the preferred practice of the invention, the parting films 30 (FIG. 3) and 82 and 84 (FIG. 6) is less than 5% of the solar reflective film's thickness. The hypothesis is that the parting film is a material that prevents, or breaks up, the crystal growth of the silver; smaller silver crystallites are expected to scatter light lees strongly than larger silver crystallites. Thus, coatings having solar reflective coatings comprising smaller silver crystallites are expected to exhibit lower haze and lower specular excluded solar-weighted glass-side reflectance (SpEx WIRg) than coatings having solar reflective coatings comprising larger sliver crystallites. Materials that can be used for parting films can include, but are not limited to, oxides of metals, e.g. but not limited to oxides of Ti, Sn, Zn and combinations thereof. However, if desired, metals such as titanium can be used as parting layers, but such metallic materials will fend to be absorptive and therefore reduce the overall level of solar reflectance.

In this embodiment of the invention, the solar reflective coating 27 can be any material that reflects solar energy, such as but not limited to gold, silver, aluminum, copper, platinum, osmium, iridium, ruthenium, rhodium, palladium, or other noble metals and combinations, alloys, mixtures, or, blends thereof. Solar reflecting coating 27 can have two films 28a and 28b of the same material, e.g. silver films 28a and 28b, or of different material, e.g., film or sublayer 28a of silver and 28b of gold. The solar reflecting layer can include two films having the same thickness, or two films having afferent thicknesses. Still further, the solar reflecting coating 27 can have more than two films, e.g. the solar reflecting coating can include three, four, five or more films having one or more parting layers between adjacent solar reflecting films.

The invention is not limited to the thickness of the parting layer(s), however, in the practice at the invention, the parting layer 30 has a thickness sufficient to inhibit thermally-activated crystal growth of the layers, e.g. but not limited to the layers 28a and 28b, such as might occur while the coated article is in service either at ambient temperatures or elevated temperatures. By way of illustration and not limiting to the invention, the prior art solar reflective coating 22 (see FIG. 1) is a silver coating having a thickness of 100 nm and could comprise silver crystallites having sizes ranging from greater than zero up to the full thickness of the solar reflective layer 22 (100 nm in this example) In contrast, the solar reflective coating 27 (see FIG. 3) of the invention has a solar reflective coating having two layers, e.g. but not limiting to the invention, silver layers 28a and 28b each having a thickness 50 nm. Thus, the layer 28a could comprise silver crystallites ranging from greater than zero only up to the full thickness of the silver layer 28a (only 50 nm in this example). Similarly, the layer 28b could comprise silver crystallites ranging from greater than zero only up to the full thickness of the silver layer 28b (only 50 nm in this example). The thickness of the parting film 30 is selected to cooperate with the films, coating and layers of the coating stack to provide the optical performance (e.g. spectral reflectance) of the solar mirror. In a non-limiting embodiment of the invention the parting film 30 has a thickness in the range of greater than zero to 5 nm Further, the invention is not limited to the optical properties at the solar mirror, however, in the preferred practice of the invention, the solar energy passes through the substrate 12, through the films of the coating stack to reflect the solar energy from the solar reflecting film 27 to a selected position to act on the reflected solar energy.

In one particular embodiment, the layers 28a and 28b of the reflective coating 27 are silver films each having a thickness in the range of 1 nm to 150 nm, such as 2 nm to 125 nm, such 25 nm to 150 nm, such as 50 nm to 100 nm, such as 100 nm to 200 nm, such as 100 nm to 150 nm, such as 110 nm to 140 nm, such as 120 nm to 140 nm, such as 128 nm to 132 nm. In another particular embodiment, the reflective coating 27 includes metallic silver having a thickness in the range of 1 nm to 500 nm such as 50 nm to 500 nm, such 50 nm to 300 nm, such as 50 nm to 200 nm, such as 50 nm to 150 nm, such as 70 nm to 150 nm, such as 90 nm to 120 nm, such as 90 nm to 130 nm, such as 90 cm to 100 nm, such as 90 nm to 95 nm. In the preferred practice of the invention, the silver layers 28a and 28b have a thickness in the range of 25-75 nm preferable 40-60, e.g. 50 nm.

In one non-limiting embodiment of the invention, the thickness of the layers 28a and 28b of the solar reflecting film 27 of FIG. 3, e.g. but not limited to a silver film having the parting layer 30 is determined by designing a solar mirror having a single solar reflecting film of the desired design thickness as is presently done in the art. The calculated thickness of the solar reflecting layer is divided by the number of solar reflecting films to be used, e.g. for two solar reflecting films the thickness of the reflecting layer is divided by 2, for three solar reflecting films the thickness of the reflecting layer is divided by 3, and so on.

With continued reference to FIG. 3, the surface 16 of the substrate 12 designated to face away from the sun 20 (see FIG. 2) is coated with the $TiO_2$ layer 24, the first sublayer 28b of the silver reflecting coating 27 is applied over the $TiO_2$ film 24 (FIG. 3), 74 (FIG. 6), the parting film 30 is applied over the layer 28b of silver, the layer 28a of the coating 27 is applied over the parting layer 30 and the protective coating 25 is applied over the layer 28a. As can be appreciated, the invention is not limited to the coatings discussed herein and any combination of coating, e.g. but not limited to the coatings of the solar mirrors disclosed in Pat '098 can be used in the practice of the invention.

The apparatus used to coat the substrate 12 is not limiting to the invention and can include any of the types known in the art to apply coating and films to a substrate and to one another, such as but not limited to MSVD and coating vapor deposition.

From the above discussion, the benefits and limitations of the solar reflective coating of the invention can now be appreciated. More particularly, the parting film is a material that can be deposited over a layer of solar reflective coating to the growth of sliver crystallites comprising the solar reflecting films, e.g. layers 28a and 28b, in the practice of the invention, the thickness of the parting layer 30 is in the range 0.005 to 10%, preferably in the range of 0.05 to 7.5%, more preferably in the range of 0.5 to 5%, and most preferably in the range of 1.0 to 4% of the thickness of the solar reflective film 27, which includes the sublayers 28a and 28b. Materials that can be used include, but are not limited to, oxides of metals, e.g. but not limited to oxides of Ti, Sn, Zn and combinations thereof. However, if desired, metals, such as titanium can be used as parting film, but such metallic materials will tend to be absorptive of the solar energy passing through substrate and coating stock, and therefore can reduce the overall level of solar reflectance.

Encapsulated Coating Stack for a Solar Mirror to Increase Useable Life of the Solar Mirror In the above discussion of solar mirrors, e.g. but not limited to solar mirrors (FIG. 1), 7 (FIG. 3), 26 (FIG. 4), 70 (FIG. 5), and 72 (FIG. 6) reference was made to the Permanent Protective Overcoat ("PPO") 25. The PPO protects the films of the coating stack 35, 32, 34, 86 and 88 (FIGS. 1, 2, 4, 5 and 6, respectively) between the surface 16 of the substrate 12 and the respective PPO layer of the coating stack 32. For example and not limiting to the invention, the PPO coating 25 of the solar mirror 26 of FIG. 4 protects surface 89 of the sublayer 28a of the solar reflective coating 28 against chemical and mechanical damage during handling and transporting the solar mirrors.

Figure 9:
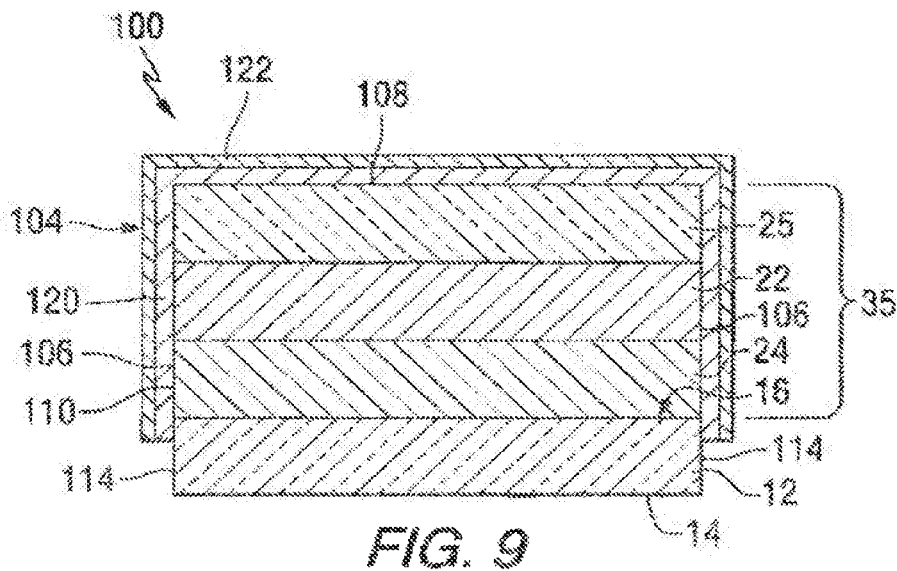
FIGS. 9-13 are views similar to the view of FIG. 3 showing non-limited embodiments of encapsulant having an encapsulation in accordance to the teachings of the invention.
Figure 10:
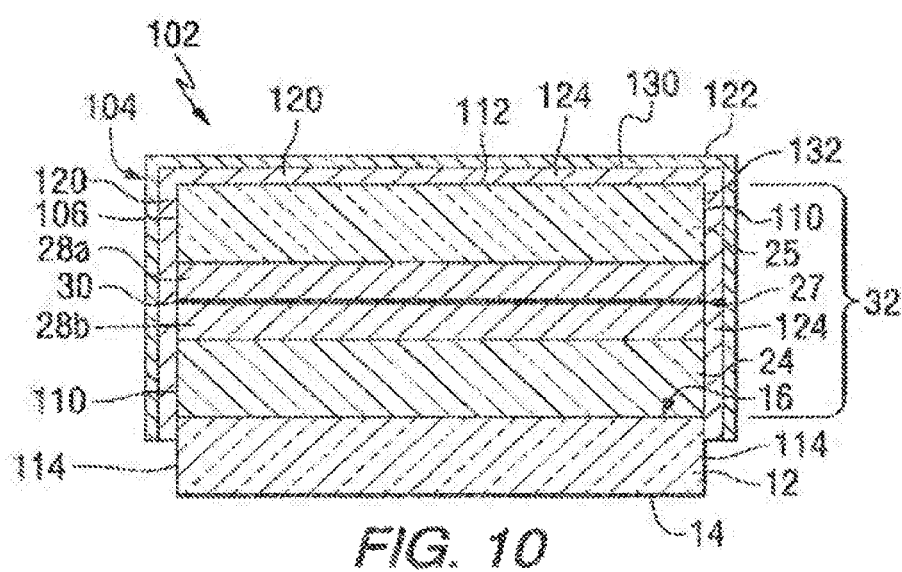

Shown in FIGS. 9 and 10 are non-limited embodiments of solar mirrors 100 and 102, respectively, of the invention having the PPO coating 25 and outer encapsulation 104 of the invention. In general, the solar mirror 100 shown in FIG. 9 includes the coating stack 35 on the inner surface 16 of the substrate 12, and the encapsulation 104 covering outer walls 106 and top surface 108 of the coating stack 35. In general, the solar mirror 102 shown in FIG. 10 includes the coating stack 32 applied to the inner surface 16 of the substrate 12, and the encapsulation 104 covering outer walls 110 and top surface 112 of the costing stack 32.

As is appreciated L by those skilled in the art, solar-reflective coatings, especially those which employ saver layer(s) are susceptible to mechanical damage and/or environmental degradation/corrosion in the environment in which the solar mirrors are used, e.g. used in the outdoor environment. In the practice of the invention, the encapsulant for a second surface solar mirror is transparent because the source of soar energy faces the surface 16 of the substrate 12, whereas a first surface solar reflecting solar mirror has the surface 14 of the substrate facing the source of solar energy. Stated another way, encapsulants 104 covering the coating stacks 32 and 35 of first surface mirrors are transparent because the encapsulant 104 is within the optical path of the incident and reflected light. Encapsulants 104 covering the coating stacks 32 and 35 of second surface mirrors are opaque because the encapsulant 104 is not within the optical path of the incident and reflected light. The primary durability screening test for solar mirrors having an encapsulant over the coating stack is generally accepted to be the Copper Accelerated Acetic Acid Salt Spray ("CASS"). The CASS test is well known in the art and further discussion regarding the CASS test is not deemed necessary.

In addition to encapsulant failing the CASS test, another drawback with the presently available encapsulants is the use of a lead ("Pb")based corrosion inhibitor in order to sufficiently protect the underlying Ag-based reflective coating from corrosion/degradation and loss of reflectance. In the years since such "high-Pb" encapsulants were deployed, the burgeoning concentrated solar power (CSP) industry has favored encapsulants having decreasing amounts of Pb, and preferably essentially being free of lead ("Pb") e.g. consider the encapsulant disclosed in U.S. Pat. No. 8,445,098 (which patent is hereby incorporated by reference). With continued reference to FIGS. 9 and 10 as needed in one non-limiting embodiment of the invention, the encapsulant 104 totally covers the top surface 108 and 112 of the coating stack 32 and 35, of the solar mirrors 102 and 100, respectively and extends past the surface 16 of the substrate 12 toward the surface 14 of the substrate 12 and is secured to the peripheral sides or edges 114 of the substrate 12 as shown in FIGS. 9 and 10. The top surfaces 108 and 112 of the coating stacks 35 and 32 in one non-limiting embodiment of the invention can be totally covered by the encapsulant 104 as shown in FIGS. 9 and 10, or the marginal edge portions of the outer surface 108 and 112 of the coating stacks 35 and 32 can be covered by the encapsulant as discussed below. By way of interest and not limiting to the invention, a prior art encapsulant tested was available from Fenzi Group (headquartered in Tribiano, Italy) and was sold under the registered trademark Solarlux®.

With continued reference to FIGS. 9 and 10, the encapsulant 104 of the invention includes a bottom or base layer 120 applied over the outer walls 108 and top surface 108 of the coating stack 35, and/or over the outer walls 110 and top surface 112 of the coating stack 32, and over the peripheral sides 114 of the substrate 12, a topcoat 122 is applied over the bottom layer 120 of the encapsulant 104. In one non-limiting embodiment of the invention, the encapsulant includes the bottom layer 120 having the ingredients and amounts listed in Table 1, and the top coat 122 having the ingredients and amounts listed in Table 2.

Suitable methods of application of the encapsulant, include but are not limited to; (1) curtain eking, (2) spray-coating, (3) flow-coating, (4) draw-down coating and (5) electrocurtain coating, e.g. as disclosed in, but not limited to U.S. Pat. No. 8,557,099, which patent is hereby incorporated by reference. In one non-limited embodiment of the invention the preferred method of application of the encapsulant 104 is curtain-coating. The basecoat 120 and the topcoat 122 of the encapsulant 104 are applied such that their geometric thicknesses are each approximately 1 mil (0.001 inch=25.4 micrometers) in their cured state (i.e. after thermal curing of the encapsulant). However, some range of thicknesses of each basecoat 120 and topcoat 122 is acceptable, e.g. but not limited to the range of 0.9 mil to 1.05 mil.

Prior to the application of the encapsulant 104 to the coating stack, e.g. but not limited to coating stack 35 and/or 32, the coating stacks are pretreated to remove any sharp (i.e. "raw" Or "cut") edges of the coating stack preferably the sharp edges are blunted or ground, using an abrasive medium such as an abrasive belt or grinding wheel, prior to application of the encapsulant 104. This practice is known as "edge-seaming" or simply "seaming". Edge-seaming of the sharp edges of the reflective-coated substrate, prior to application of an encapsulant, ultimately results in a finished mirror having so called "SP" (seamed-then-painted) edges. Edge-seaming is believed to promote some degree of "wrap-around" of the bottom layer 120 of the encapsulant 104 onto the peripheral sides 114 of the substrate 12 thereby limiting direct exposure of the reflective coating's "sidewalls" to potentially corrosive environmental agents that might chemically react with, or otherwise degrade, one or more layers of the reflective coating 22 and/or the layer(s) including the Ag or solar reflective layer. The practice of edge-seaming is also believed to remove some or all of the reflective coating from the extreme edge/perimeter of the substrate's coated surface on a microscopic scale. This concept is referred to as "micro-edge-deletion" or "micro-deletion". A similar practice is sometimes followed in order to "edge-delete" Ag-based coatings (e.g. Ag-based low-emissivity and/or solar-control coatings) from the perimeter of coated glass substrates. Such a macroscopic edge-deletion process involves removing a macroscopic width (typically several millimeters) of a coating from the perimeter of the coated substrate. Such a macroscopic edge-deletion process helps protect the coating from direct exposure to environmental agents, which might corrode or otherwise degrade the Ag-based coating 27 (see FIG. 10) and coating 22 (see FIG. 9). After the edge-seaming step, the reflective-coated substrate is thoroughly cleaned in any convenient manner, such as using a flat glass washer, and dried.

Prior to application of the encapsulant 104, a pre-treatment is preferably applied to the outer walls 110 and the top surface 108 of the coating stack 32, and the outer walls 106 and top surface 108 of the coating stack 35 of the solar mirrors 102 and 100, respectively, to promote adhesion of the encapsulant to the outer surfaces of the coating stacks. The preferred pre-treatment includes a silane-based chemistry; one suitable composition is 0.15 wt. % gamma-Aminopropyltriethoxysilane in deionized (DI) water. The pre-treatment chemistry is sprayed onto the outer surfaces or walls 106 and 110, top surface 108 and 112, of the coating stacks 25 and 27 and exposed surfaces of the substrate 12 and allowed to well on the surfaces for about 30 seconds residence time, before being thoroughly rinsed off by flooding the surface with deionized water. Immediately following the rinse process, the remaining rinse water is sheeted off the outer surfaces 106 and 110, the top surfaces 108 and 112, of the coating stacks 32 and 35, respectfully, and exposed surfaces of the substrate 12. The pre-treated coating stacks, the coating stacks 32 and 35, and the substrate 12 are pre-heated to about 150° F. (66° C.) prior to application of the basecoat or bottom layer 120 of the encapsulant 104.

A sufficient quantity of the chemistry of the basecoat 120 is applied to the outer walls or surfaces 106 and top surface 108 of the coating stack 35, and outer walls or surfaces 110 and top surface 112 of the coating stack 32 to achieve a basecoat dry film thickness (OFT) of about 1.1 mils (27.94 micrometers) on the finished article. The process parameters (e.g., width of curtain coater's orifice, conveyer line speed of substrate through paint curtain, etc.) for the basecoat application process are typically empirically adjusted so as to achieve the desired basecoat DFT. Immediately following the application of the basecoat chemistry, the substrate travels through a "flash zone" wherein heat continues to be applied so as to enable solvents to evaporate from the applied liquid basecoat layer 120 of the encapsulate 104. A suitable temperature for this "flash process" is about 150° F. (66° C.). The application of heat in the flash zone also pre-heats the substrate 12 to prepare it to receive the base coat 120 of the encapsulate 104. A minimum substrate surface temperature of about 120° F. (49° C.), immediately prior to application of the basecoat of the encapsulant, is recommended, but is not limiting to the invention.

Immediately after removal from the "flash zone" for the topcoat layer 122, the encapsulant 104 of the coated substrate is cured in a suitably vented furnace/oven, which is designed for curing of polymeric coatings/paints on large-area substrates. For any given encapsulated substrate, typical recommended residence time ("ride time") in the furnace is 251 seconds. The recommended exit temperature of the substrate's encapsulated surface, immediately upon exiting the curing furnace, is about 280° F. (138° C.). After exiting the furnace, the encapsulated reflective-coated solar mirror is cooled-down, With reference to FIGS. 9 and 10, and not limiting to the invention, the encapsulated reflective-coated glass substrate was a finished solar mirror having, but not limiting to the invention (1) a substrate (e.g. the glass substrate 12); (2) an MSVD-deposited Ag-based bilayer 28a and 28b of the reflective coating 27 over one major surface of the substrate, e.g. but not limited to surface 16 of the substrate 12; (3) the parting layer 30 on the Ag-based sublayers 28b; (4) the bilayer 28a over the parting film 30; and (5) the base coat 120 of the encapsulant 104 applied over or on the outer wall 106 and top surface 108 of the coating stack 35 and/or cuter surface 105 and top surface 108 of the MSVD-deposited reflective coating and a top layer 122 applied on the base coat 120.

Optionally, the bottom surface 14 of the substrate 12 of the finished solar mirrors 100 and 102 can be cleaned using an acid-etching process and rinsed/dried prior to unloading. The purpose of such a bottom-surface acid-etching process is to remove any contaminants, especially silver-based contaminants that might absorb light and consequently negatively impact the overall reflectance of the finished mirror. A solution of ferric chloride ($FeCl_3$) in deionized water is one suitable bottom-surface etchant/cleanser.

After being exposed to the etchant, the entire mirror is thoroughly rinsed with water to remove all traces of etchant from the finished mirror, and dried using an air knife or similar apparatus.

Finished solar mirrors of the invention, encapsulated in the aforementioned fashion with the encapsulant 104, exhibit acceptable adhesion to the glass substrate 12 as determined using the ASTM 03359 Cross-Hatch Adhesion test; a cross-hatch adhesion rating of "4B" or better is typical. Similarly, mirrors exhibit an acceptable level of cure as determined using the ASTM D5402 Solvent Rub Test; 200 double-rubs, or more, using a xylene-soaked cloth without visible degradation of the encapsulant is typical.

Unless indicated otherwise, the above method for preparing the coating stacks 32 and 35 for the application of the encapsulant 104 is practiced prior to the application of the encapsulant in the following discussion of non-limiting embodiments of the invention.

The discussion is now directed to non-limited embodiments of solar mirrors of the invention having encapsulated coated stacks, e.g. but not limited to the coating stack 35 (FIG. 9) and coating stack 32 (FIG. 10). These non-limiting embodiments of the invention relate to solar reflecting mirrors, e.g., but not limited to highly-reflective solar mirrors, such as, but not limited to solar mirrors having coating solar reflecting sublayers 28a and 28b separated by a parting medium 30 (FIG. 9) and solar mirrors having solar reflecting coating, e.g. the solar reflecting coating 22 of the type shown and discussed in regards to FIG. 9. The silver reflective coatings 27 and 22 are highly-reflective to solar radiation and are usually employed for Concentrated Solar Thermal Power (CSTP) and Concentrated Photovoltaic (CPV) applications. CSTP/CPV technologies are sometimes referred to more generally as Concentrated Solar Power (CSP) technology. However, it should be appreciated that the solar mirrors of the invention can be employed for other applications including, but not limited to, display applications, projection applications, lighting applications, entertainment applications, laser applications, directed-energy weapons applications, optical applications in general, or any applications which employ highly-reflective articles for the solar wavelength spectrum or any subset thereof, or for any application in which the invention described exhibit suitable optical properties/performance or other suitable characteristics. As used herein a highly reflective solar film, e.g. but not limited to a silver reflective solar film has a solar reflection in the range of 85 to 95%. With continued reference to FIGS. 9 and 10 as needed, the encapsulant 104 of the solar mirror 100 (FIG. 9), and/or of the solar mirror 102 (FIG. 10), includes, but is not limited to, a polyester melamine having the bottom or base layer 120 and/or a top layer 122 with selected ones of the layers 120 and 122 having metal-resistance-enhancing film or particles of Inconel 600, zinc, aluminum, copper, magnesium, and mixtures, alloys, or combinations of two or more thereof. In the preferred practice of the invention, the metal selected was Zinc ("Zn"), because in addition to being a resistance-enhancing metal, Zn is a highly electrically conductive metal and can be used electrodeposition coating.

The invention is not limited to the form of the zinc, and the invention contemplates Zn in the form of flakes, powder and coated MSVD coated film. In the preferred practice of the invention, Zn was in the form of flakes. The Zn in flake form was selected because samples of encapsulant coating were made having Zn flakes, Zn powder and zinc film and the zinc flakes were the better performer for the electrodeposition of the encapsulant. The Zn flakes are identified by the number 124 end shown only in phantom and only in FIG. 11.

In the practice of the invention, when the Zn flakes are used as a resistance-enhancing metal or a sacrificial cathodic protection, the Zn flakes are mixed with the chemistry of the bottom layer 120 and the chemistry of the top layer 122 of the encapsulant 104. When the Zn flakes are used to provide a resistance-enhancing metal or a sacrificial cathodic protection, and as a cathode for electrode deposition, the Zn flakes are mixed with the chemistry of the base layer 120 of the encapsulant 104. In the following discussion, the Zn flakes are used to provide a resistance-enhancing metal or a sacrificial cathodic protection, and as a cathode for electrode deposition; the Zn flakes 124 were formulated in a moisture stable binder i.e. the polyester melamine to fit curtain coating application. For a more detailed discussion of the zinc flakes in the polyester melamine reference is made to U.S. Published Patent Application No. 201310003206 (Pub. '206), U.S. Published Patent Application No. 2013/0003206 is hereby incorporated by reference.

In the practice of this embodiment of the invention, a Zn-rich polyester melamine-based topcoat 122 of the encapsulant 104 (FIGS. 9 and 10) is used. For some end-use applications, it may be desirable for the finished solar mirror to be subjected to certain types of high-temperature processing, such as thermal tempering, heat-strengthening, thermal bending, etc. In that event, the reflective-coated substrate is preferably subjected to such high-temperature processing before application of the encapsulant 104. Although the coating stack 35 of the solar mirror 100 and the coating stack 32 of the solar mirror 102 can survive high-temperature, processes, it is expected that the polymeric-based encapsulant 104 over the coating stack 35 and/or will not survive such processes.

Figure 11:
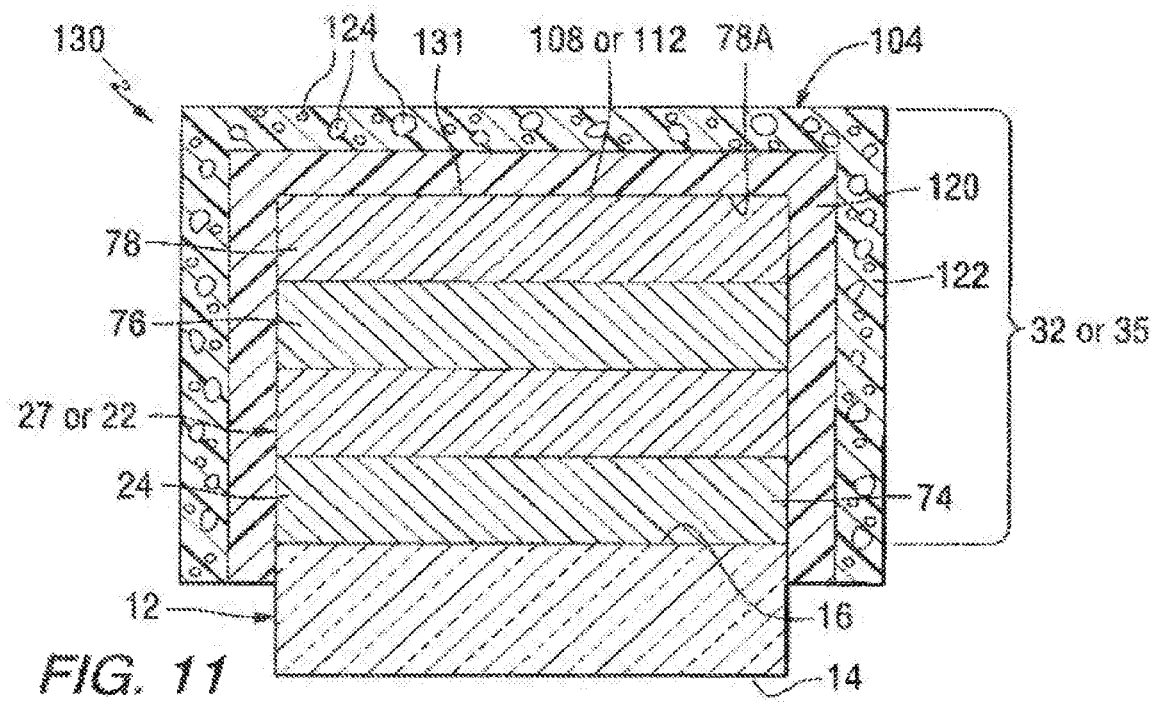

Shown in FIG. 11 is a non-limited embodiment of solar mirror 130. The solar mirror 130 is the solar mirror 70 or 72 having the encapsulant 104. Unless indicated otherwise, the following discussion is applicable to the solar mirrors 70 and 72. With continued reference to FIG. 11, the encapsulant 104 of the invention includes but is not limited to (1) the polyester melamine-based basecoat 120 impregnated with metallic corrosion-inhibitive pigments 124 (e.g. metallic Zn flakes 124), and (2) a metallic corrosion-inhibitive pigment free (e.g. metallic flakes 124)-free and polyester melamine-based topcoat 122. This encapsulant 104 is herein also referred to as "PEM encapsulant". The solar mirror 130 includes, but is not limited to, the MSVD coating stack 32 and/or 35 having coating layers 74, 76, 78 and 25 with the PPO coating 26 of the type disclosed in U.S. Pat. No. 6,016,542 (hereinafter also referred to as "Pat. '542"). Pat '542 is hereby incorporated by reference, in this discussion of the non-limited embodiment of the invention, the basecoat 120 of the PEM encapsulant 104 is applied over the layer 25 of the PPO (top surface 108 and/or 112 of the coating stack 32 and 35, respectfully) and the outer walls 108 and 110 of the outer walls of the coating stack 32 and 35.

As is appreciated by those skilled in the art, the PPO coating or the MSVD film 25 or 80 is electrically non-conductive and the Zn flakes 124 in the base layer 120 of the PEM encapsulant 104 has a dual function, namely the Zn flakes 124 in the basecoat 120 of the PEM encapsulant 104 slows the corrosion of the Ag reflecting coating 22 and 27 by adsorbing moisture. More particularly, the Zn flakes 124 adsorb moisture passing through the topcoat or layer 122 of the PEM encapsulant 104 into the base coat 120 of the PEM encapsulant 104 and is corroded, after which the moisture moves through the base coat 122 of the PEM encapsulant 104 and attacks the coating stack 32 and/or 35 in particular the Ag reflecting coating 28 and/or 22. The second function of the base coat 122 of the PEM encapsulate 104 is to provide a cathode when an e-coating is applied over the base layer 120 of the PEM encapsulant 104. The invention is not limited to the manner in which the e-coat top layer 122 is applied, and the top coat 122 of the PEM encapsulant 104 can be applied in the manners disclosed in U.S. Patent Application Publication No. 2013/0003206 ("Pub, '206"). Pub. '206 is hereby incorporated by reference.

A detailed discussion of the PEM encapsulant is provided in Pub. '206 and U.S. Pat. No. 8,557,090 ("Pat. '099"). Pub. '206 and Pat. '099, which documents in their entirety are incorporated herein by reference.

Shown in Tables 1 and 2 are the formulation of the basecoat 120 (Table 1) and the top coat 122 (Table 2) used in the practice of the Invention to curtain coat the encapsulant 104 on the coating stack 32 as shown in FIG. 10 in accordance to the invention.

The Table 1 below shows the main ingredients as well as general functions of each ingredient:

TABLE 1

| Ingredient | Weight (grams) |
| --- | --- |
| Polyester Resin[1] | 57.74 |
| Phosphatized Epoxy[2] | 4.41 |
| Melamine[3] | 45.80 |
| Solvent[4] | 127.9 |
| Flow Additive[5] | 2.17 |
| Anti-settling Agent[6] | 23.18 |
| Catalyst[7] | 1.41 |
| Zinc Flake[8] | 381.53 |
| Silane A-187 | 5.00 |

[1]The polyester resin was POLYMAC HS 57-5776, from Momentive Specialty Chemicals, which had a solids weight of 85 percent by weight, based on total weight, a hydroxyl number of 178 (based on solids weight), a hydroxyl equivalent weight of 315 (based on solids weight), and an acid number of 10 (based on solids weight).
[2]The phosphatized epoxy was obtained commercially from PPG Industries, Inc., under the tradename HEQ-9346.
[3]The melamine was RESIMENE R-718, commercially available from INEOS Melamines Inc.
[4]The solvent was composed of 20.4 percent by weight of SOLVESSO 100 (from Exxon Mobil Corporation), 25.8 percent by weight of butyl CELLOSOLVE, and 53.8 percent by weight of butanol, in each case based on total weight of the solvent.
[5]The flow additive was composed of: AL-61-1477, polyolefin oil (18.4% by weight, commercially available from Shamrock Technologies); AWY-3046. silicon fluid (27.6% by weight commercially available from Momentive Performance Materials, Inc.); and RCH-8794, polybutyl acrylate (54.0% by weight, commercially available from E. I. du Pont de Nemours and Company), the percent weights being based in each case on total weight of flow additive.
[6]The anti-setting agent was composed of 53.2 percent by weight of BENTONE SD-2 clay material (commercially available from Elemintis Specialties, Inc.), 30.6 percent AEROSIL 200 fused silica (commercially available from Evonik Industries), and 4.1 percent by weight of BYK 410 rheology additive (commercially available from BYK USA Inc.), the percent weights each being based on total weight.
[7]The catalyst was NACURE 2500 amine neutralized p-toluenesulfonic acid, commercially available from King Industries.
[8]The zinc flakes 124 had the trade designation Z45, which is commercially available from Purity Zinc Metals, and had a length to thickness ratio of 20:1.

The ingredients of Table 1 were mixed using a coves blade for at least 30 minutes until a Hegman rating of 6.5 (on a scale of 1 to 8) was reached. Solvent (a 1:1 by weight mixture of SOLVESSO 100 and butyl CELLOSOLVE) was mixed with the grind paste so as to form a sacrificial cathodic coating composition having a viscosity suitable for spray application.

The sacrificial cathodic coating composition was curtain coated over a reflective glass substrate, and allowed to flash at ambient room temperature to remove solvent. The applied sacrificial cathodic coating had a thickness in the range of 1.0-1.2 mils.

A polyester melamine coating composition (free of lead) for use as the outer organic polymer coating top coat 122 of the encapsulant 104 was prepared as shown in Table 2 below:

TABLE 2

| Ingredient | Weight (grams) |
| --- | --- |
| Polyester Resin[9] | 120.90 |
| Phosphatized Epoxy[2] | 7.97 |
| Melamine[3] | 18.19 |
| Solvent[4] | 38.1 |
| Flow Additive[5] | 2.17 |
| Catalyst[7] | 0.47 |
| TiO$_2$ | 89.8 |

[9]The polyester resin was obtained commercially from PPG Industries, Inc. under the designation HP 73-5480 SP3, and had a solids weight of 65 percent by weight, based on total weight, a hydroxyl number of 89.2 (based on solids weight), a hydroxyl equivalent weight of 628.9 (based on solids weight), and an acid number of 3.8 (based on solids weight).

The Ingredients of Table 2 were mixed using a cowls blade for at least 30 minutes until a Hegman rating of 6.5 (on a scale of 1 to 8) was reached. Solvent (a 1:1 by weight mixture of SOLVESSO 100 and butyl CELLOSOLVE) was mixed with the grind paste so as form an outer organic polymer coating composition having a viscosity suitable for spray application.

The lead-free outer organic polymer top coat 122 prepared from the grind paste of Table 1 was curtain coated, using mini curtain coaters, over the previously applied sacrificial cathodic coating i.e. over the base coat 120. The sacrificial cathodic coating i.e. the base coat 122 and the outer organic polymer coating i.e. the top coat 122 were together cured at a temperature of 320° F. for 4 minutes, 11 seconds in a Hedinair oven (not shown). The outer organic polymer coating i.e. top coat 122 had a thickness of 1 mil (25 microns).

In one non-limiting embodiment of the invention, the coating process involves cleaning the glass substrate 12 having dimensions of 6 inch×12 inch×3.3 mm MSVD mirror with DI water, then pretreating it with A1100 Mane at ratios of 5% in (25% isopropyl alcohol and 75% water). The glass substrate 12 is then preheated to 150° F. for 1 minute prior to application of the basecoat 120 (see FIG. 11). The basecoat 120 was then flashed at 150° F. about 1 minute to remove some of the solvent in the base coat 120 and the top coat 122 applied. The combination is then cured together in the Hedinair oven for 3 minutes 20 seconds. Cure is verified by using >100 double MEK rubs. The samples are then cut to expose edges and tested on screening tests like CASS.

The base layer 120 and the top layer 122 of the PEM encapsulant 104 are applied on top of the MSVD-deposited solar-reflective coating stack 32 or 35 shown in FIG. 11. Suitable methods of application of the encapsulant 104 include, but are not limited to: (1) curtain-mating, (2) spray-coating, (3) flow-coating, (4) draw-down coating and (5) electrocurtain coating. The preferred method of application is curtain-coating.

The base coat 120 and the topcoat 122 of the PEM encapsulant 104 are applied such that their geometric thicknesses are each approximately 1 mil (0.001 inch=25.4 micrometers) in their cured state (i.e. after thermal curing of the encapsulant). However, in the practice of the invention it is expected that some range of thicknesses of each layer is acceptable, e.g. but not limited to 0.5 mil to 2 mil.

Prior to application of the pre-treatment and encapsulant, any sharp (i.e. "raw" or "cut") edges of the reflective-coated substrate are removed and the surfaces cleaned as discussed above.

Further, prior to application of the Pem encapsulant 104, a pre-treatment is preferably applied to surface 131 of the coating layer 80. The coating layer 80 is a protective overcoat of Si (85%)-Al (15%) oxide layer to protect the solar reflective coating stack 32 and 35 (see FIG. 11). The pretreatment of the surface 131 promotes adhesion of the Pam encapsulant 104 to the surface 131 of the coating layer 80. The invention contemplates cleaning the outer surface of the coating stacks 32 and 35 to enhance the adhesion of the mating stack and the base layer 120 of the encapsulant 104 of the solar cell 130. A detailed discussion of the PPO coating 25 is provided in U.S. Pat. No. 8,445,098.

The invention is not limited to the adhesion promoter that can be used in the practice of the invention, and any of the known adhesion promoters can be used in the practice of the invention, in one non-limiting embodiment of the invention A preferred pre-treatment included but is not limited thereto a silane-based chemistry one suitable composition is 5 wt. % gamma-Aminopropyltriethoxysilane on total solution eight in a pre-mixed matrix of 25 wt. % isopropanol: 75 wt. % deionized water; commercially available forms of this sane chemistry are Silquest® A-1100 available from Momentive Corporation or General Electric Corporation. The pre-treatment chemistry is sprayed onto the coating column or stack 32 and/or 35 and allowed to dwell on that surface for 30 seconds residence time, before being thoroughly rinsed off by flooding the surface with deionized water. Immediately following the rinse process, the remaining rinse water is sheeted off the coating stack 32 and/or 35 using an air knife or similar apparatus. The pre-treated coating stack is then pre-heated to about 200° F. (93° C.) prior to application of the PEM basecoat 120.

The invention is not limited to the method of applying the PEM basecoat 104 chemistry and the methods include but are not limited, curtain-coating, spray-coating, flow-coating, electrodeposition coating and draw-down coating. For application via a curtain-coating process, the as-received Zn-PEM basecoat chemistry is reduced to the recommended application viscosity (15-23 seconds, #3 Zahn cup) using a suitable solvent such as 2-Butoxyethanol (also known as "butylcellosolve"), xylene, Solvesso® 100 solvent, similar solvents, or combinations thereof. A sufficient quantity of the basecoat chemistry is applied to the reflective-coated substrate so as to achieve a basecoat dry film thickness (DFT) of about 1.1 mils (27.94 micrometers) on the finished article. The process parameters (e.g. width of curtain coater's orifice, conveyer line speed of substrate through paint curtain, etc.) for the basecoat application process are typically empirically adjusted so as to achieve the desired basecoat DFT. Immediately following the application of the PEM basecoat chemistry, the substrate moves through a furnace wherein heat continues to be applied so as to enable solvents to evaporate from the applied liquid basecoat layer. The area in which the solvent is removed is called for purposes of clarity as "flash zone".

The application of heat in the flash zone also pre-heats the substrate to prepare it to receive the top chemistry of the PEM encapsulant 104 chemistry; a minimum substrate surface temperature of about 120° F. (49° C.), immediately prior to application of the topcoat 122 of the PEM encapsulant 104.

A variety of methods are acceptable to apply the PEM topcoat 122 chemistry including, but not limited to, curtain-coating, spray-coating, flown acing, and draw-down coating. For application via a curtain-coating process, the as-received PEM topcoat chemistry 122 is reduced to a recommended application viscosity (15-23 seconds, #3 Zahn cup) using, a suitable solvent such as 2-Butoxyethanol (also known as "butylcellosolve"), xylene, Solvesso® 100 solvent, similar solvents, or combinations thereof. A sufficient quantity of the PEM topcoat chemistry is applied to the substrate so as to achieve a topcoat dry film thickness (DFT) of about 1.0 mils (25.4 micrometers) on the finished article. The process parameters (e.g., width of curtain coater's orifice, conveyer line speed of substrate through paint curtain, etc.) for the topcoat application process are typically empirically adjusted so as to achieve the desired topcoat DFT. Immediately following the application of the topcoat chemistry of the Zn-PEM encapsulant, the substrate optionally travels through a second "flash zone" so as to permit so tints to evaporate from the applied liquid topcoat layer.

Immediately after emerging from any "flash zone" for the topcoat layer 122 of the PEM encapsulant 104, the coated substrate is cured in a suitably vented furnace/oven which is designed for curing of polymeric coatings/paints on large-area substrates. For any given substrate coated with the PEM encapsulant 104, typical recommended residence time (ale known as "ride time") in the furnace is about 251 seconds. The recommended exit temperature of the substrate's encapsulated surface, immediately upon exiting the curing furnace, is about 280° F. (138° C.). After exiting the furnace, the encapsulated reflective-coated glass is permitted to cool-down in preparation for unloading from the manufacturing line. At this point, the solar mirror constitutes a finished mirror including: (1) a substrate (e.g. a glass substrate 12), (2) an MSVD-deposited Ag-based reflective coating on one major surface of the substrate (coating column or stack 166), and (3) the PEM encapsulant 104 applied on top of the MSVD-deposited reflective coating stack 32 or 35.

Optionally, the bottom surface of the finished mirror, e.g. the surface 14 of the substrate 12 (see FIG. 11) can be cleaned using an acid-etching process and rinsed/dried prior to unloading. The finished mirror is then stored and shipped in any usual manner.

Finished solar mirrors, encapsulated in the aforementioned fashion with the PEM encapsulant 104, exhibit acceptable adhesion to the substrate as determined using the ASTM D3359 Cross-Hatch Adhesion test; a cross-hatch adhesion rating of "4B" or better is typical. Similarly, mirrors exhibit an acceptable level of cure as determined using the ASTM D5402 Solvent Rub Test; 100 double-rubs, or more, using a methyl ethyl ketone-soaked cloth without visible degradation of the encapsulant is typical.

Non-Limiting Embodiments of the Invention Using PEM Encapsulant on Coating Stacks without a PPO Layer As is appreciated by those skilled in the art, the PRO layer 25 of the coating stacks 32 and/or 35 has a sheet resistance value greater than mega ohm/square. As discussed above, for eleotrodeposition coatings, electrical connection to the outer surface or top surface 108 of the PPO layer 25 of the coating stack 35 of the solar mirror 100 (see FIG. 9), and electrical connection to the outer surface 112 of the coating stack 32 of the PRO layer 25 of the solar mirror 102 (see FIG. 10), is accomplished by adding electrically conductive material to the base layer 120 of the PEM encapsulant 104. In the practice of the invention, zinc flakes 124 were added to the base layer 120 (see Table 1) of the PEM encapsulant 104 because in addition to zinc providing an electrical conduction, zinc is also a metal-resistance-enhancing film. The coating stack 32 and/or 35 without the PRO layer 25 has the surface 78A of the layer 78 (FIG. 11) available for electrical connection. The surface 78A is expected to have a sheet resistance value less than 0.5 mega ohm/square. In the non limited embodiments of the invention discussed below one or both of the layers 120 and 122 of the PEM encapsulant 104 covering the surface of the coating stack 32 and/or 35 is free of lead (see Tables 1 and 2), With continued reference to FIGS. 9 and 10 as needed, the encapsulant 104 of the solar mirror 100 (FIG. 9), and/or of the solar mirror 102 (FIG. 10), includes, but is not limed to, a polyester melamine having the bottom or base layer 120 and/or a top layer 122 with selected ones of the layers 120 and 122 having metal-resistance-enhancing film or particles of Inconel 600, zinc, aluminum, copper, magnesium, and mixtures, alloys, or combinations of two or more thereof. In the preferred practice of the invention, the metal selected was Zinc, because in addition to being a resistance-enhancing metal, Zn is a highly electrically conductive metal and can be used electrodeposition coating, in either case the absence of the PPO layer 25 allows reduction in the level of costly Zn flakes 124 used in the base coat 120 of the PEM encapsulant 104 by eliminating the PPO layer 23 while maintaining the same or improving the level of cathodic protection to the solar reflective surface 22 and/or 27.

As can be appreciated the formulation for the base layer 120 of the PEM encapsulant 104 is found on Table 1 and the formulation for the top layer 122 of the PEM encapsulant 104 is found on Table 2. The presence of the Zn flakes 124 listed is Table 1 is optional and is discussed in detail below.

In the following non-limiting embodiments of the invention, a solar mirror, e.g., but not limited to the solar mirror 130 of FIG. 11 has a coating stack without the PPO layer 26 and has the two layer encapsulant 104 (see FIG. 11). As mentioned above the PPO layer 26 provides chemical and mechanical protection for the mayor surface 78A of the film or coating 78 of the coating stack 32 and 35. With or without the presence of the PPO layer 25, the PEM encapsulant 104 provides the chemical and mechanical protection for the major surface 75A and the coating stack 32 and 35. The protection provided by the PPO layer 25 to the coating stack 32 and/or 35 is now provided by the PEM encapsulant 104. More particularly, shown in FIG. 11 is solar mirror 130 having the MSVD coating stack 32 or 35 having layers 24, 76 and 78, with solar reflecting coating 22 or 27. The base coat 120 of the PEM encapsulant 104 having the Zinc flakes 124 is applied over the top surface 78A of the layer 78 and the outer walls 108 and 110 of the coating stack 32 and 35 of the reflective article or solar mirror 130.

The Zn flakes 124 in the bottom layer 120 and the top layer 122 of the PEM encapsulant 104 has the function of slowing the corrosion of the Ad layer 27 and/or 22 by adsorbing moisture in the atmosphere passing into the top layer 122 and bottom layer 120. More particularly, the Zn flakes are used to provide a resistance-enhancing metal or a sacrificial cathodic protection, and as a cathode for electrode deposition; the Zn flakes 124 were formulated in a moisture stable binder i.e. the polyester melamine to fit curtain coating application. For a more detailed discussion of the zinc flakes in the polyester melamine reference is made to U.S. Published Patent Application No. 2013/0003206 (Pub. '206)

As can be appreciated, the invention contemplates further reductions and/or modifications to the solar mirror 130. For example and not limiting to the invention, the bottom layer 120 can have the zinc flakes, and the top layer 122 can be free of Zinc flakes as shown in FIG. 11, or both the layers 120 and 122 can be free of Zinc flakes, or both layers 120 and 122 can have the zinc flakes. The encapsulant 104 can have only one layer which can be any thickness.

Figure 13:
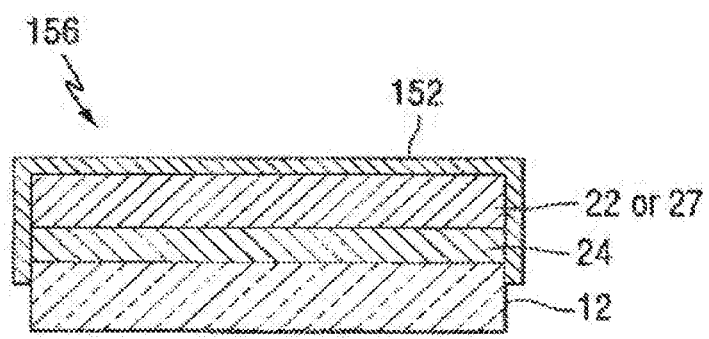

As can be appreciated, the invention contemplates additional non-limiting embodiments of the invention by alternating the components of the solar mirror 130 shown in FIG. 11. Unless indicated otherwise the modifications to the solar mirror 130 discussed below can be made to the solar mirrors discussed above, e.g. but not limited to solar mirrors 5 (FIG. 1), 7 (FIG. 3), 70, (FIG. 5), 72 (FIG. 6), 100 (FIG. 9), 102 (FIG. 10), 130 (FIG. 11) and 134 (FIG. 13, discussed below).

Non-limited embodiments of the invention include but are not limited to:

Solar Mirror A includes but is not limited to the coating stack 32 or 36; the bottom layer 120 and the top layer 122 of the PEM encapsulant are each without metal-resistance-enhancing film or particles, e.g. Zn flakes 124. The layer 122 can be electro deposited because surface 78A of the coating stack 32 or 35 is electrically conductive.

Solar Mirror B includes but is not limited to no metal-resistance-enhancing film or particles e.g. Zn flakes 124 Zn in the bottom layer 120, and metal-resistance-enhancing film or particles, e.g. Zn flakes 124 in the top layer 122, of the PEM encapsulant. Preferably but not limiting to the invention, the layers 120 and 122 of the PEM encapsulant can be deposited by e-coating. Instead of using zinc, the invention contemplates using other metal-resistance-enhancing film or particles.

Solar Mirror C includes but is not limited to metal-resistance-enhancing film or particles, e.g. Zn flakes 124 in the bottom layer 120 and in the top layer 122 of the PEM encapsulant. Metal-resistance-enhancing film or particles other than Zn can be used.

Solar Mirror D includes metal-resistance-enhancing film or particles, e.g. Zn flakes 124 in the bottom layer 120, and no Zn in the top layer 122, of the Zn-PEM encapsulant. The layer 122 can be electro-coated. Metal-resistance-enhancing film or particles other than Zn can be used in the practice of the invention.

Preferably but not limiting to the invention, the coaling films and layers of Solar Mirrors A-D can be applied by any appropriate coating process including, but not limited to slot, curtain coating, end/or electro deposition.

The invention is not limited to the manner in which the e-coat top layer 122 is applied, and the top coat 122 of the PEM encapsulant 104 can be applied by flow coating in the manner disclosed in U.S. Patent Application Publication No. 2013/0003206 ("Pub. '208"), which publication is hereby incorporated by reference. As can be appreciated the addition of Zn flakes 124 to aid in the e-coating adds additional costs to the PEM-encapsulant 104 of the coating stack. In another non-limited embodiment of the invention, the reduction in the use of Zn is provided. The Zn flakes 124 are added to the base layer 120 of the PEM encapsulant 104 to provide a conductive surface for e-coating. The elimination of the PPO layer 25 reduces the amount of metal-resistance-enhancing film or particles, e.g. Zn flakes 124 needed in the PEM encapsulant 104 by about 50%. The solar mirror 130 of the invention shown in FIG. 11 now includes the coating stack, and the base layer of the PEM encapsulant 104 having reduced amounts of Zn. It is estimated that the Zn content in this embodiment of the invention can have a Zn flake reduction of 50%.

In either case the absence of the insulating PPO layer 25 should also allow reduction in the level of costly Zn flakes in the base coat of the PEM encapsulant by eliminating the PPO layer 25 while maintaining the same (or improving) the level of cathodic protection to the silver.

U.S. Pat. No. 8,557,099 (Pat. '099) discloses an apparatus for and method of coating a reflective article, e.g. a solar mirror with an electrodeposition coating.

Previously second surface solar mirrors have typically been encapsulated with two or even three-layer systems that include first applying a corrosion resistant basecoat, followed by a protective topcoat. These can be applied by traditional wet coating methods such as curtain coating.

If the basecoat is electrically conductive such as the basecoat of the partially organic metal containing basecoat 120 of the PEM encapsulant 104, the to e.g. but not limited to the topcoat 122 applied over the basecoat 120 of the PEM encapsulant 104 can be an electrodeposition topcoat, e.g. of the type disclosed in Pat. '099, which provides many additional advantages such as better uniformity, thickness control, higher transfer efficiency, less waste, low volatile organic content, etc. However, if the top layer of the reflective structure as described in Pat. '099 is an insulating material then a conductive basecoat is still required in this case to perform the electrodeposition easily. It the reflective mirror film is considered so that there is no significant insulating film on the top surface of the coating stack, the mirror can be encapsulated by direct electrodeposition of an electrodeposition paint formulation without the need for an electrically conductive basecoat, e.g. but not limiting to the invention the base coat 120 of the encapsulant 104.

This single layer PEM encapsulant coating provides significant cost reduction and potential process advantages including much more flexibility in manufacturing design, such as the possibility of installing a cascade electrodeposition coater of the type disclosed in Pat. '099 at a MSVD production facility without requiring a basecoat application line as well.

Figure 12:
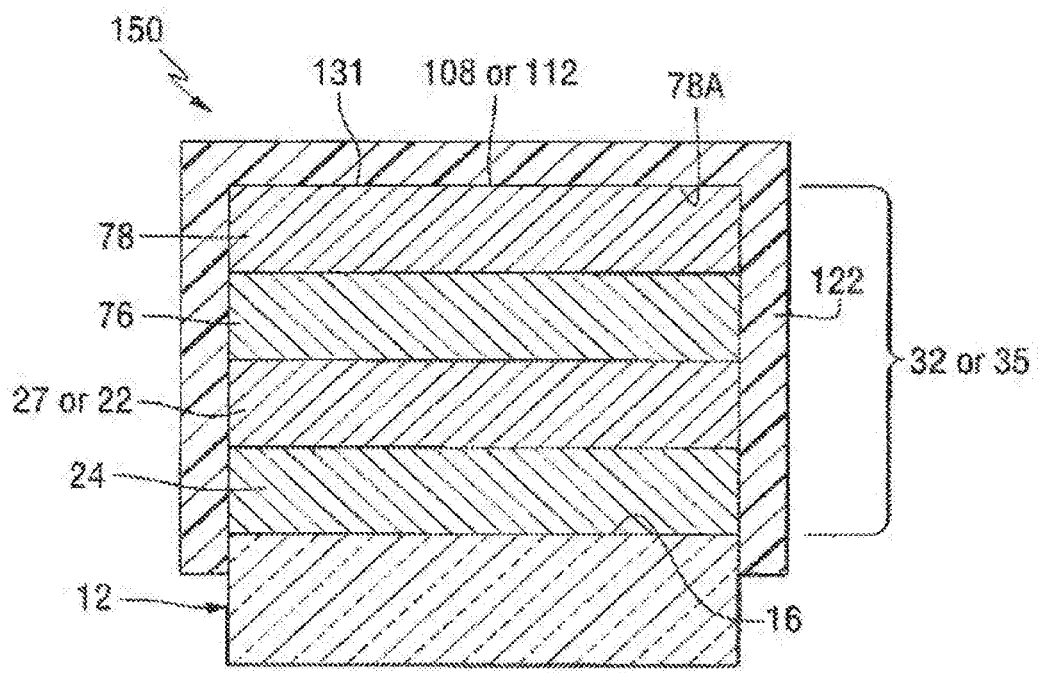

With reference to FIG. 12 there is shown a non-limiting embodiment of a solar mirror 150. The soar mirror 150 includes the substrate 12, the underlayer 24, and the solar reflecting layer 22 or 27. In place of the conductive encapsulant bash coat 120 of the PEM encapsulant 104 is the solar reflecting layer 22 or 27 of the coating stack 32 or 35 without the PPO layer 25. The function of the encapsulant basecoat 120 is replaced with an electrodeposited encapsulant 152 of the type disclosed in Pat. '099, or the solar reflecting layer 22 or 27 of the coating stack 32 or 35 without the PPO layer 25.

The electrodeposited encapsulant 152 of the solar mirror 150 was fabricated and tested and passed the CASS Fog Test.

With reference to FIG. 13 it can now be appreciated that based on the forgoing, solar mirror 156 shown in FIG. 13 can be reduced to the substrate 12, the underlayer 24, the solar reflective coating 22 or 27 and the electrodeposited encapsulant 152.

Figure 15:
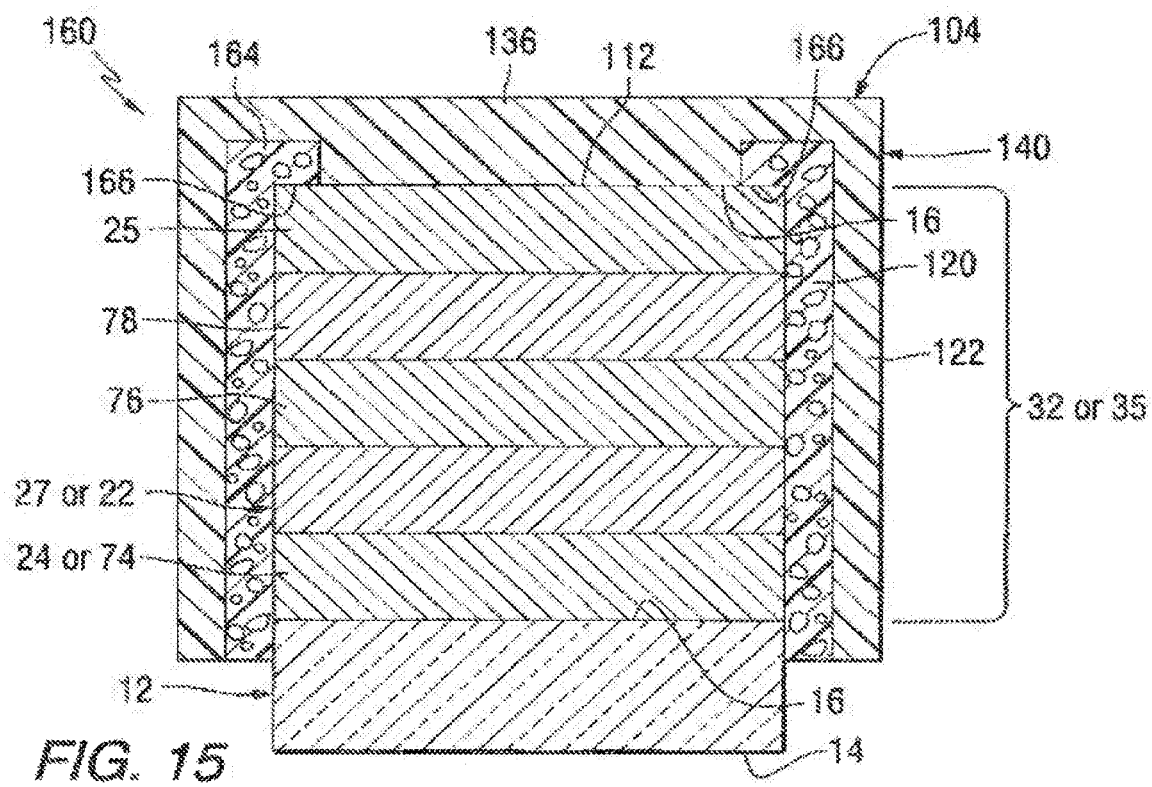
FIG. 15 is a view taken along line 15-15 of FIG. 14.
Figure 14:
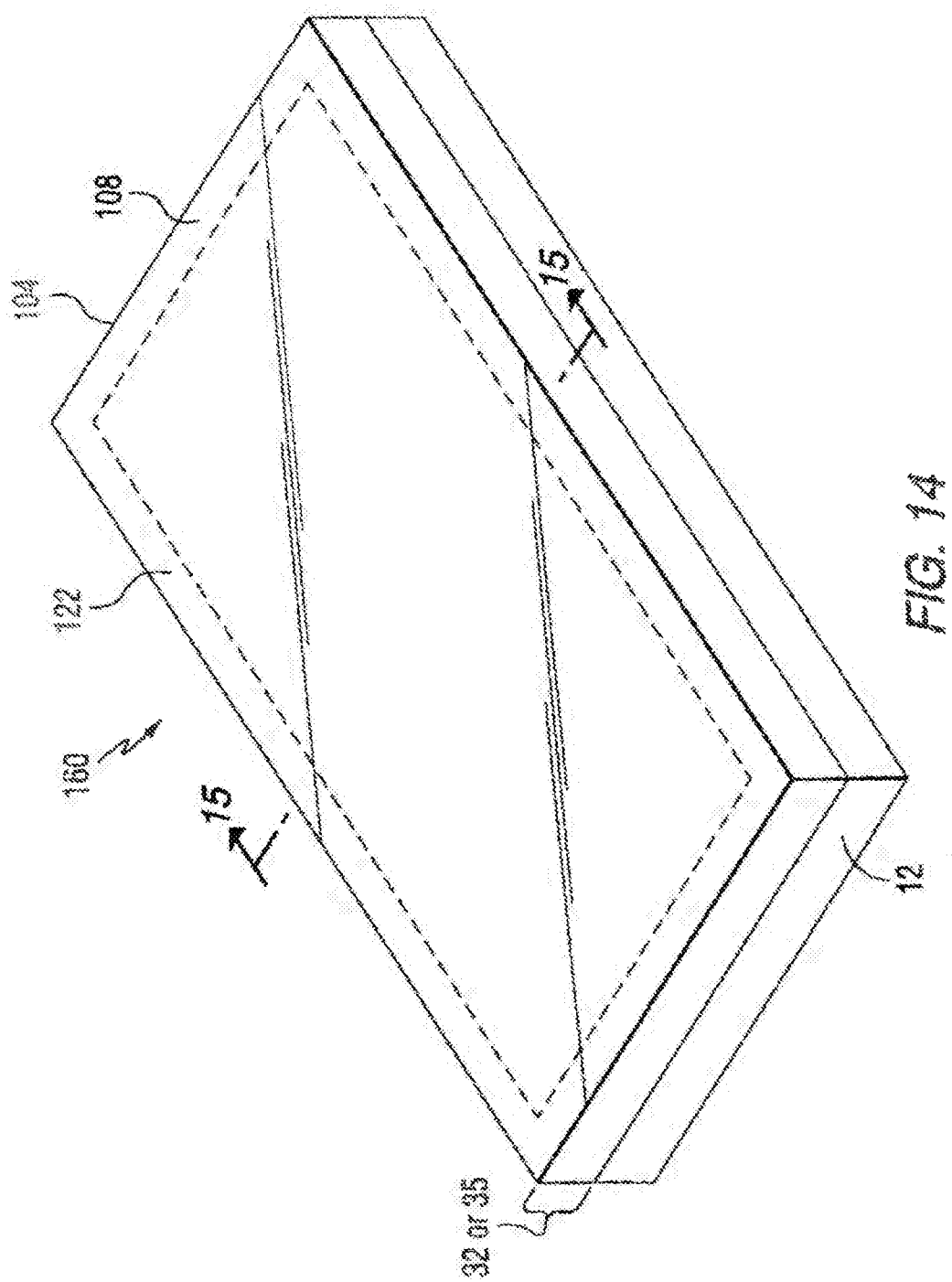
FIG. 14 is an isometric view of a flat solar reflecting mirror incorporating features of the invention.

Non-Limiting Embodiments of the Invention Using Framed PEM Encapsulant on Coating Stacks with a PPO Layer The following discussion makes reference to the solar mirror 160 shown in FIGS. 14 and 15, however, it is understood that the discussion unless indicated otherwise is applicable to all the solar mirrors discussed herein. With reference to FIG. 15, the solar mirror 160 includes the coating stack 32 or 35 applied to the surface 16 of the substrate 12. The coating stacks 32 and 35 each include the underlayer 24 over the surface 16 of the substrate 12; the solar reflecting coating 27 or 22 over the underlayer 24, the layers 76 and 76 over the solar reflecting coating 27 or 22, end the PPO layer 25 over the coating layers 76 and 78. As can now be appreciated, to prevent or reduce corrosion of the solar reflecting coating 27 and 22, and other films of the coating stacks 32 and 35, the coating stack includes the PPO layer 25 and the PEM encapsulation systems discussed above.

During the CASS testing it was noted that the position that corrosion of the coating stack 32 and 35 usually begins at the outer walls of the coating stack 35 and the outer walls 110 of the coating stack 32, and moves inward, seldom beginning on the major surface, e.g. the top surface 108 of the PPO coating 25. It was concluded that the center portion 164 of the top surface 108 of the PPO layer 25 does not have to be coated with the base layer 120 and the zinc flakes 124 of the PEM-encapsulant 104. As can now be appreciated, eliminating the base coat 120 and the zinc flakes 124 therein of the PEM-encapsulant 104 over the center portion 164 of the PPO layer 25 provides a significant reduction in the cost of materials and manufacturing time.

As may be recalled, in the above discussion, the base layer 120 having Zinc flakes was applied over the top surface 108 of the PPO layer 25 so that the top layer 122 of the PEM-encapsulant 104 can be e-coated to the bottom layer 120 of the PEM-encapsulant 104.

Shown in FIGS. 14 and 15 is the solar mirror 160. The solar mirror 160 has the basecoat 120 of the PEM encapsulant 104 on the marginal edges 166 of the PPO layer 25 and extends over the edges or outer walls 110 of the coating stacks 32 and 35. The top coat 122 of the PEM-encapsulant 104 is applied over the base layer 120 and over the center portion 164 of the PPO layer 25. The center portion 164 of the surface of the PPO layer 25 is blocked off during the application of the Zn basecoat 120 in any convenient manner. The topcoat 122 can be applied by selection of one of the coating process discussed herein.

By applying the Zn basecoat 120 to the peripheral edges of the coating films and the marginal edges of the PPO film 25, and applying the top coat 122 over the Zn based coat and the exposed PPO surface, sufficient corrosion protection is obtained to pass the CASS Fog Test.

The invention is not limited to the width of the Zn basecoat applied to the marginal edges of the PPO layer 25. A sample for the CASS Fog Test had a length of 3 feet and a width of 2 feet. The Zn base coat 120 on the marginal edges of the PPO layer 25 had a width in the range of 1-2 centimeters. The sample passed the CASS Fog Test. Optionally a top coat 122 can be applied over as the base coat 120 and the exposed surface of the PPO layer 25 for added protection.

The width of the base 120 overlaying the marginal edges of the PPO layer 25 is generally in the range of greater than zero to 5 inches, greater than zero to 4.5 inches, greater than zero to 4.0 inches, greater than zero to 3.5 inches greater than zero to 3.0 inches, and greater than zero to 2.5 inches.

In another test, two samples of MSVD mirror approx. 5×6 inches were masked in the center and coated by drawdown with the basecoat 120, flashed at 245° F., and top coat 122 by drawdown after removing the center mask. After cure, 1 inch was cut off of each side of the sample, leaving a 3×4 inches size sample with four painted then cut edges and a center area with no basecoat 120, only the topcoat 122. After 120 hours of CASS Fog Test exposure, there was no corrosion along any of the cut edges nor any on the center of the face that was protected by only topcoat of the encapsulation. By contrast, samples having the topcoat 122 but no base coat 120 of the PEM encapsulant 104 all failed the CASS Fog Test by 120 hours.

The advantages of this embodiment of the invention are (1) the use of anticorrosion coating to cover the edges of the coating stack and the marginal edges of the outermost sheet by a roller/spray/print/electrocoat as disclosed in Pat. '099 and Pub. '206 or similar methods, in contrast to many gallons of coating required to establish a process such as curtain coating for full-surface coverage of the outermost sheet, (2) covering only a small percentage area of the mirror near the edges greatly reduces material cost, and (3) reduction in the weight of the solar mirror.

The invention can be practiced to make second surface mirrors as discussed shove, hut can also be practiced to make first surface mirrors if the protective overcoat is transparent or if the first surface mirror itself has sufficient durability to survive with only edge protection. By applying the Zn basecoat (anticorrosion coating) to the edges of the mirror only, sufficient cathodic protection is obtained to prevent onset of corrosion, while potentially significantly reducing cost and weight of the two layer encapsulation system.

In the discussion of the non-limited embodiments of the invention, the coating stack was applied to the second surface of the substrate, the surface facing away from the sun. In this manner the sun's rays pass through the first and second surfaces of the substrate. The invention; however, is not Writing thereto, and the coating stack having the PEM encapsulant can be mounting the first surface of the substrate, e.g. the surface facing the sun by using a transparent encapsulant, e.g. removing the color pigment from the materials of the encapsulant, in this manner, the sun's rays pass through encapsulant to the solar reflecting film and reflected back through the encapsulant.

The invention is not limited to the embodiments of the invention presented and discussed above which are presented for illustration purposes only, and the scope of the invention is only limited by the scope of the following claims and any additional claims that are added to applications having direct or indirect linage to this application.

The invention claimed is:

1. An article for reflecting solar energy comprising:
a coating stack comprising:
solar reflecting films and metal oxide films, the coating stack applied on a major surface of a glass substrate, and
a protective overcoat, the protective overcoat comprising a first and a second surface, wherein the first surface of the protective overcoat is disposed toward the solar reflective films and metal oxide films; and
a polymer encapsulant over outer wall surfaces of the coating stack, the second surface of the protective overcoat and over peripheral edges of the coated article, the encapsulant comprising a base layer, a top layer and metallic corrosion-inhibitive material in the base layer, wherein marginal edge portions of the top of the coating stack and the outer walls of the coating stack are covered with the base layer and the base layer does not coat at least a portion of an area on the top surface of the coating stack, and the top layer overlays the base layer and the at least portion of the area of the top surface of the coating stack.

2. The article according to claim 1, wherein the metallic corrosion-inhibitive material is zinc flakes and the zinc flakes are in the top surface of the polymer encapsulant and the outer wall surfaces of the coating stack are covered with the base layer and the base layer is covered with the top layer.

3. The article according to claim 2, wherein the zinc flakes are in one of the following groups, Group (1) zinc flakes are only in the base layer, and Group (2) zinc flakes are in the top layer and the base layer.

4. The article according to claim 1, wherein the base layer of the encapsulant covers 2 centimeters of the marginal edges of the surface of the coating stack.

5. The reflective article according to claim 1, wherein the coating stack comprises a corrosion-resistance-enhancing and UV-absorbing layer.

6. An article for reflecting solar energy, comprising:
a coating stack secured to major surface of a glass substrate, the coating, comprising a solar reflecting layer, wherein surface of the coating stack spaced from the substrate is electrically conductive, and
a polymer encapsulant over outer wall surfaces of the coating stack, the encapsulant comprising a top layer e-coated to outer surface of the coating stack, and zinc flakes in a base layer,
wherein the base layer covers the marginal edges of the outer surface of the coating stack, and
wherein the encapsulant comprises a top layer wherein the top layer of the encapsulant covers the base layer and exposed surface portions of the outer surface of the coating stack.

7. The reflective article according to claim 6, wherein the base layer covers the outer surface of the coating stack and the encapsulant comprises a top layer positioned over the base layer.

8. The reflective article according to claim 6, wherein the base layer of the encapsulant comprises a polyester melamine having electric conductive, moisture absorbing metal flakes.

9. The reflective article according to claim 6, wherein the encapsulant comprises the top layer wherein the top layer comprises a TiO2 polyester melamine to provide ultraviolet mechanical abrasion resistant coverage.

10. The reflective article according to claim 6, wherein a permanent protective overcoat is positioned over the solar reflecting layer.

11. The reflective article according to claim 6, wherein the coating stack further comprises an intermediate film between the substrate and the solar reflecting layer.

12. The reflective article according to claim 6, wherein the article comprising the glass substrate and the solar reflecting layer further comprises an intermediate film between the glass substrate and the solar reflecting layer.

13. A solar mirror comprising:
a glass substrate,
a coating stack having a center surface and at least one marginal edge of an outer surface, wherein the coating stack is secured to a major surface of the glass substrate and comprises solar reflecting films and metal oxide films; and
a polymer encapsulant comprising a top layer, and a base layer comprising metallic corrosion-inhibitive material, wherein the polymer encapsulant covers the at least one marginal edge of the outer surface of the coating stack, wherein the top layer of the polymer encapsulant contacts the center surface of the coating stack.

14. The solar mirror according to claim 13, wherein the coating stack further comprises a protective overcoat, the protective overcoat comprising a first and a second surface, wherein the first surface of the protective overcoat is disposed toward the solar reflective films and metal oxide films.

15. The solar mirror according to claim 13, wherein the top layer of the polymer encapsulant covers the center surface of the coating stack.

16. The solar mirror according to claim 13, wherein the polymer encapsulant comprises at least one of the following groups, Group (1) zinc flakes are only in the base layer, and Group (2) zinc flakes are in the top layer and the base layer.

* * * * *